(12) United States Patent
Bushman

(10) Patent No.: US 11,779,441 B2
(45) Date of Patent: Oct. 10, 2023

(54) DENTAL FLOSSER WITH FLOSS TENSIONER

(71) Applicant: Richard P. Bushman, Stillwater, MN (US)

(72) Inventor: Richard P. Bushman, Stillwater, MN (US)

(*) Notice: Subject to any disclaimer, the term of this patent is extended or adjusted under 35 U.S.C. 154(b) by 148 days.

(21) Appl. No.: 17/184,416

(22) Filed: Feb. 24, 2021

(65) Prior Publication Data

US 2021/0259816 A1    Aug. 26, 2021

Related U.S. Application Data

(60) Provisional application No. 62/980,561, filed on Feb. 24, 2020.

(51) Int. Cl.
*A61C 15/00* (2006.01)
*A61C 15/04* (2006.01)

(52) U.S. Cl.
CPC .......... *A61C 15/046* (2013.01); *A61C 15/043* (2013.01)

(58) Field of Classification Search
CPC ...... A61C 15/00; A61C 15/046; A61C 15/043
USPC .......................... 132/323, 324, 325, 326, 327
See application file for complete search history.

(56) References Cited

U.S. PATENT DOCUMENTS

| | | | | |
|---|---|---|---|---|
| 3,734,107 A | * | 5/1973 | Thierman | A61C 15/046 132/325 |
| 3,746,017 A | * | 7/1973 | Casselman | A61C 15/046 132/325 |
| 3,759,274 A | * | 9/1973 | Warner | A61C 15/047 132/325 |
| 5,269,331 A | * | 12/1993 | Tanriverdi | A61C 15/046 132/325 |
| 7,156,110 B2 | | 1/2007 | Landry | |
| 8,671,958 B2 | | 3/2014 | Borg et al. | |
| 2002/0078974 A1 | | 6/2002 | Kossak et al. | |
| 2003/0106565 A1 | | 6/2003 | Andrews | |
| 2006/0011212 A1 | * | 1/2006 | Achepohl | A61C 15/046 132/325 |

(Continued)

FOREIGN PATENT DOCUMENTS

| | | |
|---|---|---|
| WO | WO 2002/094118 | 11/2002 |
| WO | WO 2004/084760 | 10/2004 |

OTHER PUBLICATIONS

International Search Report and Written Opinion, PCT Int'l App. No. PCT/US2021/019476, dated Jun. 29, 2021 (19 pp.).

(Continued)

*Primary Examiner* — Rachel R Steitz
(74) *Attorney, Agent, or Firm* — FisherBroyles, LLP

(57) ABSTRACT

A dental flosser having a handle, a dental floss support mounted to the handle and having first and second projections, each projection defining a tip, a floss dispensing spool mounted to the handle, and a floss collecting spool mounted to the handle. The dental flosser also includes a thumbwheel operable to rotate the collecting spool to cause uptake of floss from the dispensing spool, across the tips of the first and second projections, and onto the collecting spool, and a spool brake member mounted to the handle and operable to fix rotated positions of the dispensing and collecting spools, and to automatically release the dispensing and collecting spools to rotate upon operating the thumbwheel.

29 Claims, 14 Drawing Sheets

(56) References Cited

U.S. PATENT DOCUMENTS

| | | | |
|---|---|---|---|
| 2006/0254610 A1* | 11/2006 | Chen | A61C 15/046 132/325 |
| 2007/0204879 A1* | 9/2007 | Chen | A61C 15/046 132/325 |
| 2011/0041870 A1 | 2/2011 | Kalbfeld et al. | |
| 2014/0166042 A1 | 6/2014 | Aragon | |
| 2019/0167398 A1 | 6/2019 | Bixby | |

OTHER PUBLICATIONS

International Search Report and Written Opinion from related Int'l Pat. App. PCT/IB2023/054762, dated Jul. 24, 2023 (10 pp.).

* cited by examiner

DENTAL FLOSSER WITH FLOSS TENSIONER

CROSS REFERENCE TO RELATED APPLICATION

This application claims priority to U.S. Provisional Patent Application No. 62/980,561, filed Feb. 24, 2020, and entitled "DENTAL FLOSSER WITH FLOSS TENSIONER", the entire disclosure of which is incorporated herein by this reference.

TECHNICAL FIELD

The present disclosure relates generally to dental flossing devices, and more particularly relates to dental flossers with floss tensioning and used floss take up features, and related methods of manufacture and use of such dental flossers.

BACKGROUND

Tooth flossing is an important part of the regular maintenance of the health of teeth and gums. In its simplest form, floss is dispensed from a container, and each end of a piece of floss is wrapped around a finger on each of the users two hands. The floss is brought into the mouth for use by the motion of both hands. This can be an awkward procedure under the best of circumstances. It is particularly awkward for a person with limited mobility or in circumstances where a person is flossing the teeth of another person such as a dental technician or a person aiding a disabled person or child. Therefore, various attempts have been made to develop implements for simplifying the flossing procedure.

The flossing apparatuses generally have a divergent or fork-shaped head portion with two prongs for holding a piece of dental floss between them. This head portion replaces the fingers that are used in the manual flossing procedure and is the part of the apparatus which is brought into the mouth for doing the actual flossing. The floss must be held relatively taught between the two ends of the prongs to provide a stiff piece of floss for the user to work between their teeth.

The flossing apparatuses also generally have a handle portion which the user can grasp with one hand. While holding the handle, the user can move the forked floss holding end of the apparatus to a proper location for conducting the flossing. There may also be a neck connecting the fork shaped head portion with the handle portion. The neck may make for greater mobility of the apparatus when the fork shaped head portion is inserted in the oral cavity, especially for reaching rear teeth.

While the designs have differed significantly in the shape and orientation of the handle and a fork shaped head portion, an even greater variation exists in the treatment of the dental floss itself in the apparatus. For example, the dental floss can be fixedly attached to the head portion such that the entire head portion must be replaced to refresh the piece of dental floss in position for use. This arrangement is particularly unsatisfactory since the floss may have to be refreshed quite frequently which would make the necessary replacement of the entire head portion both inconvenient and unnecessarily expensive.

Therefore, several designs of flossing apparatuses have contained dispensing spools within the apparatus to supply a source of fresh floss for replenishing the portion of floss in position for use. These apparatuses have a means for cutting off the spent floss once fresh floss has been delivered across the head of the apparatus for use. A tying portion is provided for holding the floss rigidly against the tension produced when using the floss. These designs are not optimal because the spent portion of the floss must be handled by the user for advancing new floss in position for use and for removing the old floss. This is unpleasant when the user is flossing their own teeth, and unhygienic when the user is flossing the teeth of another person. Furthermore, the procedure is time consuming.

To address the problems associated with the disposal of used floss, several designs have incorporated a spool for the specific purpose of taking up the used dental floss. These designs have various degrees of complexity. Previous designs for dental flossing apparatuses have not provided a mechanism whereby the user can advance the dental floss easily with one hand with a minimum of effort while keeping the floss under sufficient tension to allow flossing, particular when using a light, manual apparatus that is relatively inexpensive (e.g., a disposable apparatus or one where the dispensing and collection spools are maintained in cartridges that can be replaced), and that can maintain the tension along the floss while the user is advancing the floss without any effort beyond advancing a knob.

For these and other reasons, there is a need to provide improved dental flossers.

SUMMARY

The dental flosser and related methods of operating a dental flosser as disclosed herein provide a number of advantages related to management of the unused and used floss, and maintaining tension in the floss during use.

One aspect of the present disclosure relates to a dental flosser having a handle, a dental floss support, a floss dispensing spool, a floss collecting spool, a thumbwheel, and a spool brake. The dental floss support is mounted to the handle and includes first and second projections, each projection defining a tip. The floss dispensing spool and floss collecting spool are mounted to the handle. The thumbwheel is operable to rotate the collecting spool to cause uptake of floss from the dispensing spool, across the tips of the first and second projections, and onto the collecting spool. The spool brake member is mounted to the handle and operable to fix rotated positions of the dispensing and collecting spools, and to automatically release the dispensing spool to rotate upon operating the thumbwheel.

The thumbwheel may project from the handle, and rotation of the thumbwheel may initiate rotation of the collecting spool. The thumbwheel may project from opposite sides of the handle. The dental flosser may also include a dispensing gear mounted to the housing coaxially with the dispensing spool, and a collecting gear mounted to the housing coaxially with the collecting spool, and the spool brake member may be operable to engage the dispensing and collecting gears to control rotation of the dispensing and collecting spools. The dispensing gear may include gear teeth with a different size than gear teeth of the collecting gear. The gear teeth of the collecting gear may be larger than the gear teeth of the dispensing gear. The collecting gear may have a larger diameter than a diameter of the dispensing gear. The thumbwheel may define the dispensing collecting gear.

The dental flosser may also include at least one floss tensioner positioned in the housing and operable to contact the floss to provide resistance to uptake dispensing of the floss. The dental flosser may also include a spool tensioner operable to apply a compression force on a rotation spindle of the collecting dispensing spool when the spool brake fixes rotated positions of the dispensing and collecting spools.

Another aspect of the present disclosure relates to a dental flosser that includes a handle, a dental floss support mounted to the handle and having first and second projections, each projection defining a tip, a floss dispensing spindle rotatably mounted to the handle, and a floss collecting spindle rotatably mounted to the handle. The dental flosser also includes a thumbwheel mounted to the collecting spindle to rotate the collecting spindle to cause uptake of floss from the dispensing spindle, across the tips of the first and second projections, and onto the collecting spindle. The thumbwheel has a plurality of gear teeth. The dental flosser further includes a dispensing gear mounted coaxially with the dispensing spindle, the dispensing gear having a plurality of gear teeth, and a brake member mounted to the handle and operable to engage the gear teeth of the thumbwheel and dispensing gear to fix rotated positions of the dispensing and collecting spindles, and to automatically release the dispensing spindle to rotate upon operating the thumbwheel.

The dispensing gear may be formed integral with the dispensing spindle. The dental flosser may also include a collecting gear mounted coaxially with the collecting spindle, and the thumbwheel is mounted to the collecting gear. The collecting gear may be formed integral with the collecting spindle. The brake member may include a first arm with arranged to engage the gear teeth of the thumbwheel, and a second arm arranged to engage the gear teeth of the dispensing gear.

A further aspect of the present disclosure relates to a method of operating a dental flosser. The method includes providing the dental flosser with a handle, a dental floss support defining first and second tips, a floss dispensing spool, a floss collecting spool, a thumbwheel, and a spool brake, rotating the collecting spool with the thumbwheel to uptake floss from the dispensing spool, across the first and second tips, and onto the collecting spool, and fixing rotated positions of the dispensing and collecting spools with the spool brake when the thumbwheel is stationary. The spool brake automatically releases the dispensing spool to rotate upon rotating the thumbwheel.

The spool brake may include first and second arms arranged to engage the collecting and dispensing spools, respectively, to fix the rotated positions. The thumbwheel may be arranged coaxially with the collecting spool, the thumbwheel may include a plurality of gear teeth for engagement by the first arm of the spool brake, and the dental flosser may further include a dispensing gear arranged coaxially with the dispensing spool and include a plurality of gear teeth for engagement by the second arm of the spool brake. Application of a tension force to the floss may increase contact forces between the spool brake and the dispensing and collecting spools. The housing may include a base and a cover, the cover may be pivotally connected to a rear end of the housing at a location opposite a front end where the first and second tips are located, and the cover may be releasably held in a closed position by at least one snap feature positioned along a side of the base between the rear and front ends.

Another aspect of the present disclosure relates to a dental flosser spool that includes a base and a hub mounted to the base. The dental flosser spool is configured to be releasably mounted to a dental flosser, and the hub is receptive of a length of floss to be wound thereon, the length of floss being used floss collected during use of the dental flosser or unused floss wound on the hub prior to use of the dental flosser.

The dental flosser spool may be reversibly mounted in the dental flosser in a first orientation when used floss is wound on the hub, and a second orientation when the unused floss is wound on the hub. The dental flosser spool may be releasably mounted in the dental flosser in a first position for mounting used floss on the hub, and in a second position when mounted with unused floss on the hub. The base may include at least one slit formed therein, the at least one slit providing a connection point of the used floss or unused floss to the dental flosser spool. The base may have a flat disk shape and the hub may have an elongate cylindrical shape. The dental flosser spool may include a key slot configured to receive a spool mounting key of the dental flosser. The dental flosser spool may include a pass through bore configured to receive a spool mounting member of the dental flosser.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label.

Figure 1:
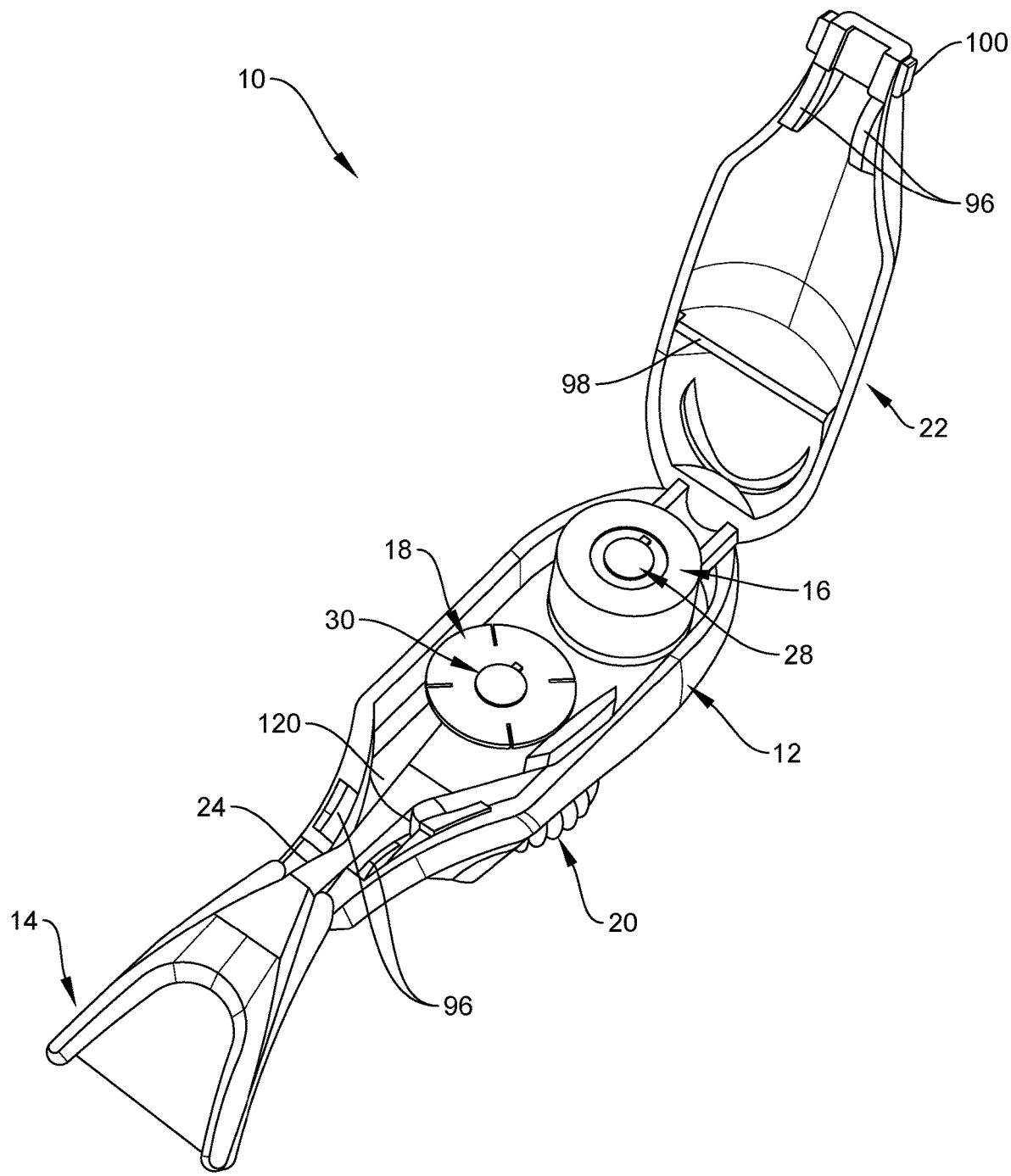
FIG. 1 is a perspective view of an example dental flosser in accordance with the present disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The present disclosure is directed generally to dental flossing devices, and more particularly relates to dental flosser with floss tensioning, dispensing and take up features, and related methods for making and using such dental flossers.

The present disclosure also relates to an improved dental flosser that holds and dispenses floss in a more efficient way for the purpose of flossing teeth. The dental flosser allows a user to advance new floss into a ready-for-use position without contacting the floss, which may lead to improved hygienics and use of less floss. A floss advancing mechanism allows the user to advance the floss while holding the handle and rotating a thumbwheel with a finger or several fingers (and/or thumb) from both or either side of the handle. The fresh floss is dispensed from a spool in the handle and the used floss is collected on a separate spool. Both spools are locked during flossing. An improved spool locking technique on both spindles ensures that freshly dispensed floss is at the proper tension for use. Additionally, friction is applied along the path of the floss to supply tension to the floss as the floss is being advanced. Broken floss can be easily reattached to the collecting spool. In one example, an empty spool that contained the dispensed floss can be flipped and installed to become the used floss take-up spool.

Figure 2:
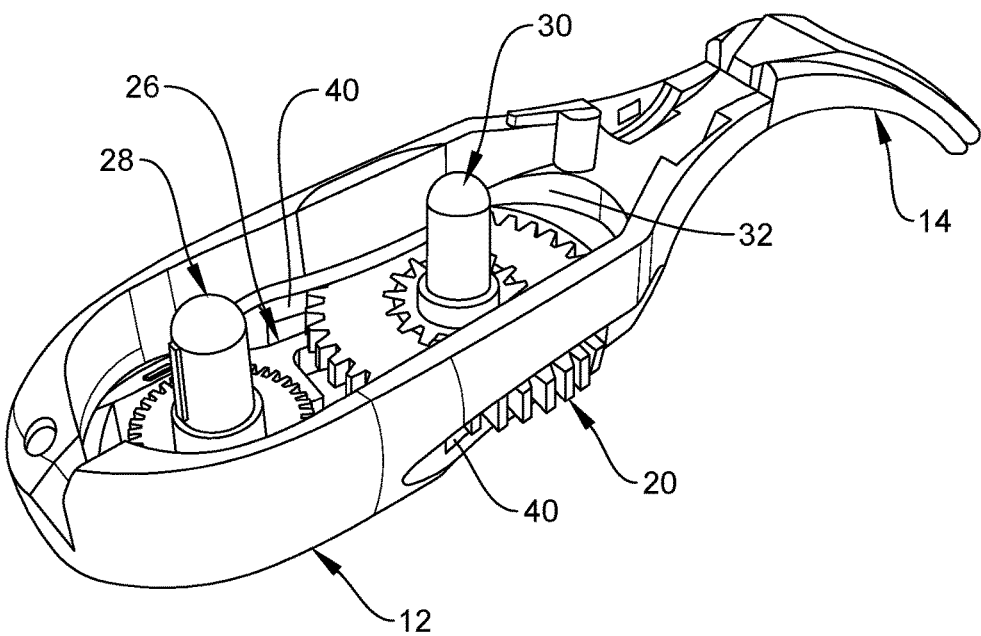
FIG. 2 is a perspective view of a portion of the dental flosser shown in FIG. 1.
Figure 3:
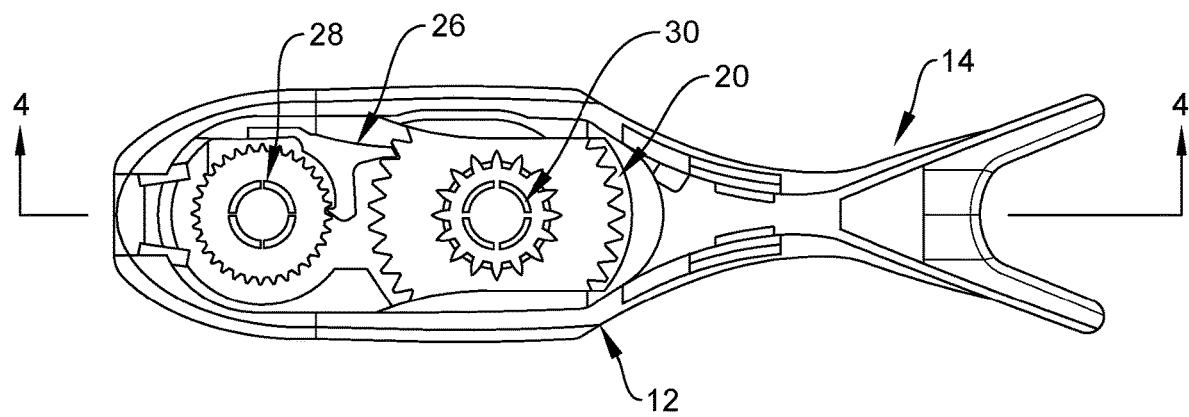
FIG. 3 is a top view of a portion of the dental flosser shown in FIG. 1.
Figure 4:
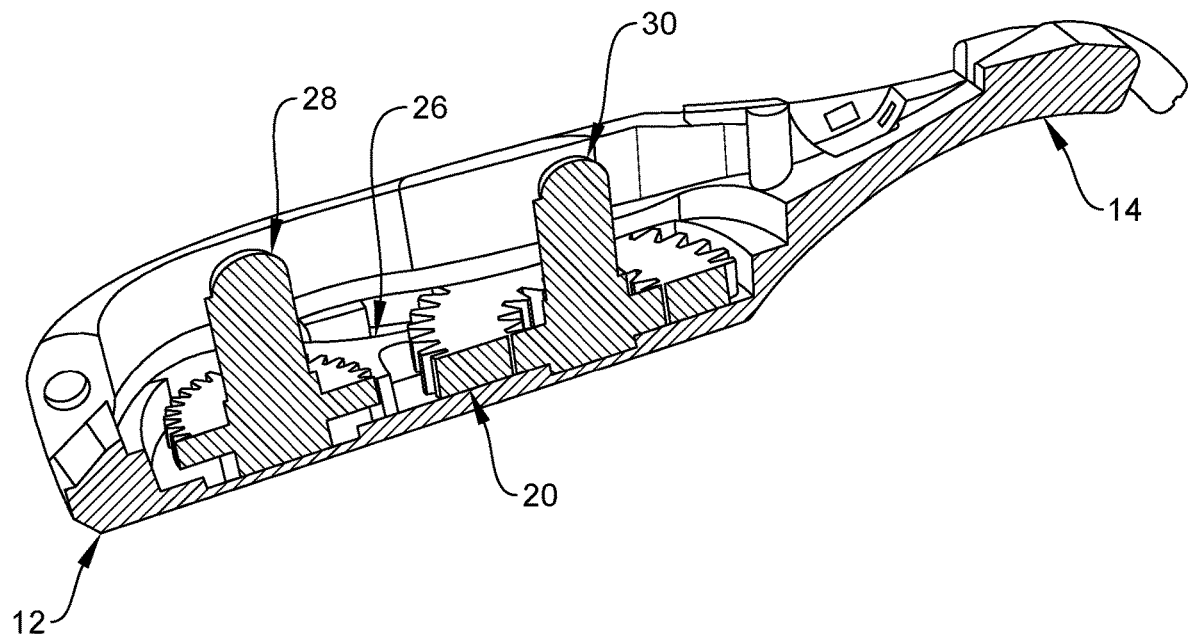
FIG. 4 is a cross-sectional view of the portion of the dental flosser shown in FIG. 3 taken along cross-section indicators 4-4.

FIG. 1 is a perspective view of an example dental flosser 10 in accordance with the present disclosure. The dental flosser 10 includes a handle 12 with a cover 22 pivotally connected thereto. The cover 22 is shown in an open position in FIG. 1. Inside the handle 12, a floss support 14, dispensing spool 16, collecting spool 18, thumbwheel 20, spool brake 26, floss 24, dispensing spindle or unwind spindle 28 and collecting spindle 30 are positioned and enclosed when the cover 22 is in a closed position relative to the handle 12. At least some of these features are additionally shown in the perspective view of FIG. 2, the top view of FIG. 3, and the partial perspective view of FIG. 4.

Figure 5A:
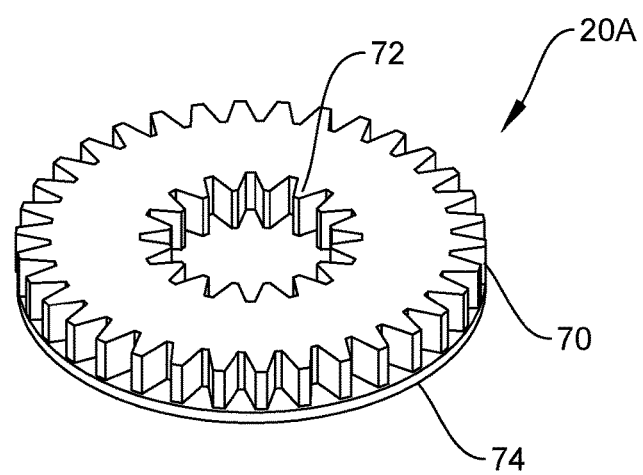
FIG. 5A is a perspective view of an alternative thumbwheel for use in the dental flosser shown in FIG. 1.
Figure 5:
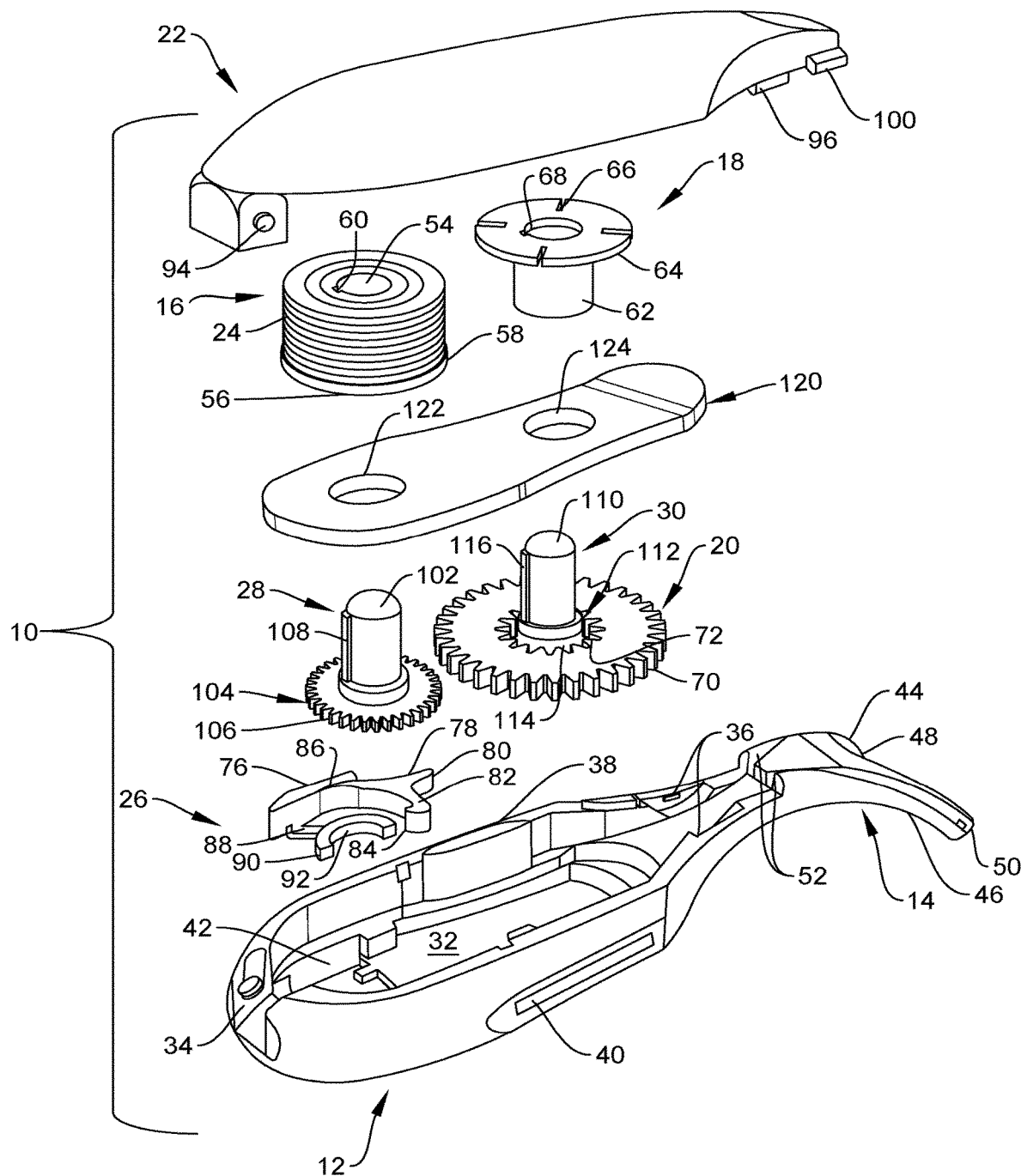
FIG. 5 is an exploded perspective view of the dental flosser shown in FIG. 1.

Referring now to the exploded perspective view of FIG. 5, the handle 12 includes a cavity 32, a cover attachment recess 34, a plurality of latch grooves 36, floss guide 38, wheel slots 40 (see also FIG. 2), and a brake recess 42. A floss guide 38 may be positioned in the cavity 32 and adjacent to the collecting spool 18. The floss guide 38 may have any of a variety of shapes and sizes. The floss guide 38 may be positioned extending parallel with a side wall of the handle 12 and may be positioned adjacent to the collecting spool 18. The floss guide 38 may provide additional friction to help maintain tension in the floss 24.

The wheel slots 40 may be formed in the handle 12 adjacent to the thumbwheel 20. The wheel slots 40 may be formed along opposite sides of the handle 12. The wheel slots 40 may be sized to permit lateral insertion of the thumbwheel 20 into the cavity 32. Once the thumbwheel 20 is inserted through the wheel slots 40, the collecting spindle 30 and collecting spool 18 may be mounted to the thumbwheel 20. The brake recess 42 may be sized to receive a portion of brake 26 for purposes of mounting the brake 26 to the handle 12. The brake recess 42 may be positioned along one of the side walls of the handle 12, such as along a side wall adjacent to the dispensing spool 16 as shown in, for example, FIG. 2. The brake recess 42 may be positioned at any desired location relative to the handle 12 and the dispensing and collecting spindles 28, 30.

The handle 12 is designed to be easily held in one hand by the user. The handle 12 has a size and shape that permits grasping by one hand of a user while orienting a thumb, finger, multiple fingers, both a thumb and a finger, or a palm of the user along the opposite sides of the handle for purposes of grasping the handle 12 and/or operating the thumbwheel 20. The dental flosser 10 may have a reduced thickness portion at an intersection between the handle 12 and floss support 14, which may provide improved maneuverability and grasping of the dental flosser 10 during use.

The floss support 14 includes first and second arms 44, 46 having first and second tips 48, 50, respectively. The first and second arms 44, 46 are mounted to the handle 12 at one end and have the first and second tips 48, 50 positioned at an opposite end spaced away from the handle 12. A plurality of floss tracks 52 extend from the cavity 32 of the handle 12 to the first and second tips 48, 50. The tracks 52 are arranged to direct the floss 24 from the dispensing spool 16 to the tips 48, 50, and back to the collecting spool 18. The tracks 52 may also provide resistance for the floss 24 that provides improved tension in the floss 24 during use.

The first and second arms 44, 46 may have a contoured shape that promotes positioning of the first and second tips 48, 50 (with the floss 24 extending therebetween) adjacent to teeth in a user's mouth. The arms 44, 46 may diverge from each other along their lengths towards the tips 48, 50. The arms 44, 46 may define a generally U-shaped or generally V-shaped structure. The tracks 52 may extend along an entire length of the arms 44, 46. The tips 48, 50 can optionally have a hole (not shown) or a notch (not shown) to help hold the floss 24 on the tips 48, 50 during use. The tracks 52 may be partially or completely covered to provide for a more aesthetically pleasing dental flosser 10. The tracks 52 may be covered to help reduce exposure of the floss 24 (i.e., the clean unused portion or the contaminated used portions of the floss 24).

The dispensing spool 16 includes a hub 54, a base 56, a plurality of slits 58, and a key slot 60. The dispensing spool 16 is configured to have the floss 24 wound thereon. A free end of the floss 24 may be inserted into one or more of the slits 58 to hold the floss 24 in place while the floss is wrapped around the hub 54. The hub 54 includes a pass-through bore and the key slot 60 is exposed along the bore. The bore is configured to receive a portion of the dispensing spindle 28 as will be described in further detail below. The key slot 60 may be configured to receive a key or key member 108 of the dispensing spindle 28 to provide a more secure connection therebetween for transfer of torque forces.

The dispensing spool 16 may include the base 56 on one end of the hub 54 or on both ends of the hub 54. The base 56 may be free of the slits 58 or have only a single slit 58. In some embodiments, a slit or other floss connecting feature is formed in the hub 54. Typically, the floss 24 is wound around the hub 54 and then slid into one or more of the slits 58 to help lock the floss into position on the dispensing spool 16 so the floss does not slip when the dispensing spool 16 is turned to take up the floss during operation of the flosser device 10. In some embodiments, it may be possible to secure the floss 24 on the dispensing spool 16 without engaging the floss in one of the slits 58, such as if the dispensing spool 16 does not include a slit 58 or other floss securing feature. For example, it may be possible to wind enough floss around the hub 54, and/or with enough tension on the hub 54, that the floss will lock or otherwise hold itself from slipping relative to the hub 54. In some cases, it may require more floss and/or wraps of the floss around the hub 54 to hold the floss in this way compared to using a slit 58 or other attachment feature that provides a more positive connection between the floss 24 and dispensing spool 16.

The collecting spool 18 may also include a hub 62, base 64, slits 66 and a key slot 68. The collecting spool 18 is configured to have used floss 24 wound thereon. A free end of the used floss 24 may be inserted into one or more of the slits 66 to retain the floss 24 in place while the floss 24 is wound around the hub 62. The hub 62 may include a pass-through bore and the key slot 68 is exposed along the pass-through bore. The pass-through bore is sized to receive a portion of the collecting spindle 30 as will be described in further detail below. In at least some arrangements, the collecting spool 18 has the same or similar size, shape and construction as the dispensing spool 16. In some examples, the dispensing spool 16, after the floss 24 is removed therefrom, can be inserted onto the collecting spindle 30 and used as the collecting spool 18. The dispensing and collecting spools 16, 18 can be interchangeable with each other. In at least one arrangement, the dispensing spool 16 may be positioned with the base 56 arranged downward along the base of the dispensing spindle 28, and the collecting spool 18 has the base 64 arranged facing upward along an upper end of the collecting spindle 30 (see FIG. 1).

The thumbwheel 20 may have a generally disc-shaped construction. A plurality of gear teeth 70 may be formed around a peripheral edge of the thumbwheel 20. The gear teeth 70 may have a dual function as gear teeth used to engage with the brake 26 to help control rotation of the thumbwheel 20, and as a gripping structure to provide improved grip for purposes of rotating the thumbwheel 20 by a thumb and/or finger(s) of the user.

The thumbwheel 20 may also include a toothed pass-through bore 72. The toothed bore 72 may be configured to receive a portion of the collecting spindle 30 as will be described in further detail below. The toothed bore 72 may provide a secure interface between the thumbwheel 20 and the collecting spindle 30 to translate a rotation force applied to the thumbwheel 20 to a rotation force applied to the collecting spindle 30.

In some arrangements, such as the embodiment shown in FIG. 5A, the thumbwheel 20 may include a comfort ring 74. The comfort ring 74 may be positioned around a peripheral edge of the thumbwheel 20 adjacent to the gear teeth 70. The comfort ring 74 may be arranged along a top and/or bottom surface thereof to permit interaction between the gear teeth 70 and the brake 26 while also providing improved comfort for the user to engage the thumbwheel 20 along its peripheral edge. In some arrangements, separate comfort rings 74 are positioned on opposite top and bottom sides of the thumbwheel 20.

The brake 26 includes a handle connector 76, a thumbwheel arm 78 having a tip 80, a dispensing spool arm 82 having a tip 84, a hinge 86, a brake pad arm 88, and a brake pad 90 having a spindle surface 92. The handle connector 76 is arranged and sized to fit in the brake recess 42 of the handle 12. The handle connector 76 may be removably inserted into the brake recess 42.

The thumbwheel arm 78 is arranged to engage the gear teeth 70 of the thumbwheel 20. Rotating the thumbwheel 20 in a rotation direction that takes up the floss on the collecting spool 18 moves the tip 80 out of the gear teeth 70, and releasing a rotational force applied to the thumbwheel 20 permits the tip 80 to be reinserted into one of the gear teeth 70, thus locking the thumbwheel 20 in a fixed position.

The dispensing spool arm 82 may extend at an angle relative to the thumbwheel arm 78. In one example, the dispensing spool arm 82 is arranged at an angle of about 90 degrees relative to the thumbwheel arm 78. In other examples, the dispensing spool arm 82 is arranged at an angle in the range of about 0 degrees to about 180 degrees relative to the thumbwheel arm 78. The dispensing spool arm 82 arranges the tip 84 adjacent to the dispensing spindle 28 to engage the tip 84 within gear teeth 106 of a gear 104 of the dispensing spindle 28. When the tip 84 is engaged with the gear teeth 106, the brake 26 locks the dispensing spindle 28 in a fixed rotated position. When the tip 84 moves out of engagement with the gear teeth 106, the dispensing spindle 28 is free to rotate, thus permitting floss 24 to unravel or dispense from the dispensing spool 16.

Since the thumbwheel arm 78 and dispensing spool arm 82 are formed as a single, unitary piece, rotating the thumbwheel 20 moves the tip 80 out of engagement with the gear teeth 70 of the thumbwheel 20 and concurrently moves the tip 84 out of engagement with the gear teeth 106 of the dispensing spindle 28. Thus, rotating the thumbwheel 20 concurrently takes up used floss 24 about the collecting spool 18 and releases unused floss 24 to be dispensed from the dispensing spool 16.

The hinge 86, brake pad arm 88 and brake pad 90 provide an additional function for the brake 26 in addition to positioning the tips 80, 84 into and out of engagement with the gear teeth of the thumbwheel 20 and dispensing spindle 28. The hinge 86 may be integrally formed as a single piece with remaining portions of the brake 26 (i.e., the handle connector 76). The hinge 86 is connected to the brake pad arm 88, which carries the brake pad 90. The brake pad arm 88 may have any desired shape or size to provide different amounts of flexibility and/or stiffness for application of a braking function on the dispensing spindle 28. The brake pad arm 88 is shown having a generally V-shaped construction with an arm or hinge point. Other configurations having different shapes and sizes are possible.

The brake pad 90 has a generally arcuate shape, or at a minimum defines the spindle surface 92 with a generally arcuate shape that is sized to engage a meeting arcuate surface of the dispensing spindle 28. In operation, when the tips 80, 84 are engaged with respective gear teeth of the thumbwheel 20 and collecting spindle 30, the spindle surface 92 of the brake pad 90 is pressed against the dispensing spindle 28 thereby causing friction that resists rotation of the dispensing spindle 28. This friction force and resistance to rotation of the dispensing spindle 28 may help maintain tension in the floss 24 across the first and second tips 48, 50.

The brake pad 90 may have any desired shape and size to interface with the dispensing spindle 28 to provide the desired resistance to rotation of the dispensing spindle 28. In other arrangements, the hinge 86, brake pad arm 88, and brake pad 90 may be formed as a separate piece from remaining portions of the brake 26 and mounted separately to the handle 12. In further embodiments, all features of the brake 26 may be integrally formed as a single piece and mounted together as an assembly to the handle 12 (i.e., via the brake recess 42). In other arrangements, as described below with reference to FIGS. 6-18, the brake 26 may have a variety of different shapes, sizes and interfaces with other features of the dental flosser in order to provide a desired brake function for one or more of the dispensing spool 16 and collecting spool 18.

One advantage of the brake 26 shown and described with reference to FIGS. 1-5 is that when the brake 26 is engaged with the thumbwheel 20 and dispensing spindle 28, application of a tension force to the floss 24 tends to more tightly lock the dispensing and collecting spools 16, 18 in a fixed rotated position rather than tending to loosen one or both of the dispensing and collecting spools 16, 18. Thus, the brake 26 is designed to maintain tension in the floss 24 during dispensing and taking up of the floss 24, and during use of the floss 24 to clean a user's teeth.

The brake thumbwheel arm 78 and brake dispensing spool arm 82 are arranged such that the thumbwheel 20 is only able to rotate in one direction. Attempting to rotate the thumbwheel 20 in an opposite direction from a direction that would take up the floss about the collecting spool 18, would lock the thumbwheel 20 with the brake 26 in that opposite rotated direction. The dispensing spool arm 82 is similarly arranged and constructed to prevent rotation of the dispensing spool 16 and dispensing spindle 28 in a direction opposite what is required to release floss 24 from the dispensing spool 16. Referring now to FIGS. 1 and 5, the cover 22 is shown including a hinge member 94, a plurality of latch members 96, a floss height guide 98, and one or more lift tabs 100. The hinge member 94 is sized and configured to engage with the cover attachment recess 34 of the handle 12 to provide a connection therebetween. The hinge member 94 may provide a pivotal connection between the handle 12 and cover 22. The latch members 96 may releasably engage with the latch grooves 36 of the handle 12. The latch members 96 may be positioned along an interior edge or side of the cover 22 so as to be retained within the cavity 32 of the handle 12 when the cover 22 is in a closed position. In other embodiments, the latch members 96 may be positioned at any desired location on the cover 22 to provide the desired releasable latching connection with the handle 12. In at least some embodiments, the latch members 96 may have a deflectable or deformable construction so as to provide a snap-fit connection between the cover 22 and handle 12.

The floss height guide 98 may extend from the cover 22 interior towards the floss 24 that is extending from the dispensing spool 16 towards the floss support 14. The floss height guide 98 may apply a contact force to the floss 24 to hold the floss in a desired vertical position within the handle 12 (i.e., the vertical position being in a direction from the thumbwheel 20 towards the cover 22). The lift tabs 100 may be positioned along an end or side of the cover 22 for a user to grasp to apply a force that disconnects the latch members 96 from the latch grooves 36. The lift tabs 100 may have any desired shape and size and be positioned at a location along a perimeter edge of the cover 22.

The dispensing spindle 28 may include a hub 102, a dispensing gear 104, gear teeth 106, and a key 108. The collecting spindle 30 may include a hub 110, a collecting gear 112 having gear teeth 114, and a key 116 extending along the length of the hub 110. The hub 102 with key 108 is sized to receive the dispensing spool 16 to provide a connection therebetween. The key 108 ensures concurrent rotation of the dispensing spool 16 with the dispensing spindle 28. The gear teeth 106 are arranged for contact by the tip 84 of the dispensing spool arm 82 of the brake 26. The gear teeth 106 may have a different size and shape as compared to the gear teeth 70 of the thumbwheel 20. As such, the brake 26 provides increased control of rotation (i.e., a finer control due to smaller teeth) for dispensing of the floss 24 from the dispensing spool 16. The different-sized gear teeth 106 relative to gear teeth 70 may also influence selection of the size and shape of the tips 84, 80 that interface with those gear teeth. For example, the tip 80 has a larger size and slightly different shape than the tip 84 as shown in at least FIG. 5 in order to better interface with the larger sized gear teeth 70. Having smaller teeth on the unwind spindle 28 allows the brake 26 to interact with the unwind spindle 28 when the spindle has smaller angles of rotation, and thus a more finely controlled rotation of the spindle 28. As a result, the dispensing spool arm 82 can lock the dispensing spindle 28 with smaller degrees of rotation and at higher tension forces. With smaller teeth, less unwind rotation is needed to allow the dispensing spool arm 82 to seat into position in the gear teeth 106, thus resulting in higher tension in the floss.

The hub 110 and key 116 of the collecting spindle 30 are sized to receive the hub 62 of the collecting spool 18. The key 116 ensures that the collecting spool 18 rotates concurrently with the collecting spindle 30 and may provide a more secure connection therebetween.

The gear 112 with gear teeth 114 are sized to mate with the toothed bore 72 of thumbwheel 20. The connection between gear 112 and the toothed bore 72 ensure that rotation of the thumbwheel 20 directly translates to rotation of the collecting spindle 30. Separating the thumbwheel 20 from the collecting spindle 30 may provide improved ease of assembling the dental flosser 10. Providing the thumbwheel 20 as a separate piece makes it possible to insert the thumbwheel 20 through the wheel slots 40 into the cavity 32 of the handle 12, and thereafter the gear 112 of the collecting spindle 30 may be engaged within the toothed bore 72 to provide an assembly. This multi-piece assembly may make it possible for the dental flosser 10 to have a more compact size and be more easily assembled.

The flosser device 10 may also include a barrier member 120, as shown in FIGS. 1 and 5. The barrier member 120 may be positioned within the handle 12 between the dispensing and collecting spools 16, 18 and the area in the handle 12 where the thumbwheel 20, gear 104 and gear 112 are located. The barrier member 120 may include openings 122, 124 through which the hubs 102, 110 extend, respectively. The barrier member 120 may be secured to the handle 12 with a snap-fit connection, adhesives, a fastener, or other connecting feature.

In addition to the features discussed above which apply tension to the floss 24 or friction along its length, the tension of the floss 24 can be supplied by applying other types of friction along its path. For example, the dental flosser 10 may include other structures or devices about which the floss 24 must pass along its path. An appropriate amount of tension may be designed into the floss 24 path. Similarly, the flexing of one or both of the thumbwheel arm 78 and dispensing spool arm 82 can be accomplished through the use of a separate spring, tensioning arm, or the like, rather than relying on the natural elastic properties of the material comprising the arms 78, 82. Also, different arrangements of gears can be used to transmit the motion of the user's finger/thumb to rotation of the collecting spool 18. The features of dental flosser 10 that help maintain tension of the flosser 10 prior to, during, and after take-up of used floss 24 onto the collecting spool 18, allows the user to immediately use the dental flosser 10 with limited additional interactions with the flosser 10 in order to achieve the proper tension along the floss 24. In this way, the user can more easily and quickly place fresh floss in a position to be used without handling the used floss. If the dental floss should break, the user can manually advance sufficient floss, thread the floss along the tracks 52 and the arms 44, 46 to the tips 48, 50 and reattach the floss to the collecting spool 18 by placing the floss within one of the slits 66. Overall, the user's contact with the dental floss is minimized. Furthermore, the dental flosser 10 is operable in a relatively simple way to add or remove one or both of the dispensing spool 16 and collecting spool 18, and operating the device to provide a relatively taut floss for use in flossing a user's teeth.

Figure 6:
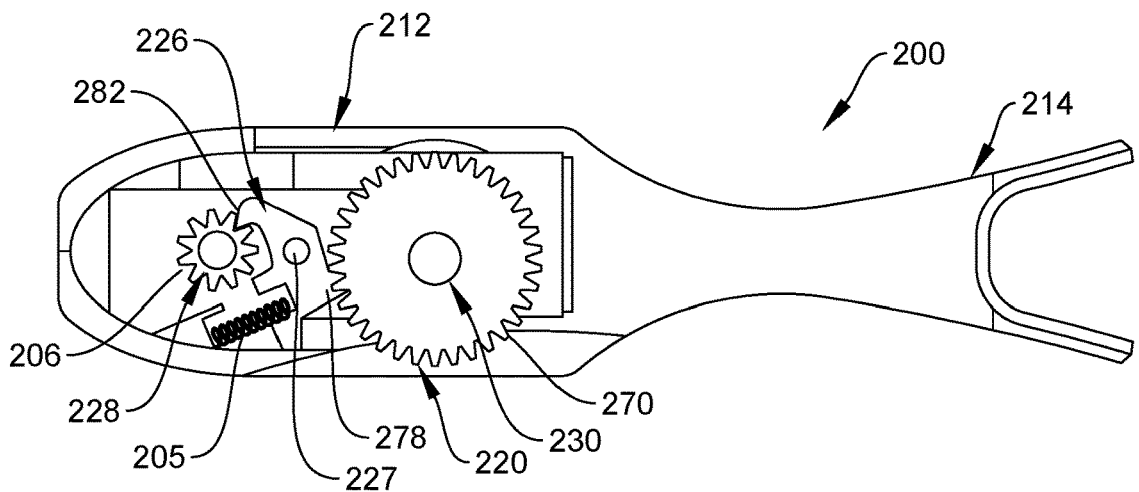
FIG. 6 is a top view of a portion of another example dental flosser in accordance with the present disclosure.

Referring now to FIGS. 6-18, further example dental flossers are shown having a variety of different configurations for the brake and other features to control rotation of the dispensing and collecting spools. FIG. 6 illustrates a dental flosser 200 having a handle 212, floss support 214, thumbwheel 220, brake 226, and dispensing and collecting spindles 228, 230. The thumbwheel 220 includes gear teeth 270. The brake 226 includes a thumbwheel arm 278 and dispensing spool arm 282. The dispensing spindle 228 includes gear teeth 206. The brake 226 is mounted to the handle 212 with a brake pivot member 227 rather than along a perimeter edge of the handle 212. The thumbwheel 220 and dispensing spool arms 278, 282 contact the gear teeth 270, 206 at different locations around the perimeter of the thumbwheel 220 and the dispensing spindle 228, respectively. The brake 226 has a significantly different size, shape and mounting location as compared to other embodiments.

The brake 226 is held in engagement with the gear teeth 270, 206 with a biasing force applied by a spring 205. The spring 205 may be interposed between the handle 212 and a portion of the brake 226. Rotating the thumbwheel 220 to take up used floss rotates the brake 226 against the biasing force of the spring 205. Upon stopping rotation of the thumbwheel 220, the spring 205 forces the thumbwheel 220 and dispensing spool arms 278, 282 back into engagement with the gear teeth 270, 206, respectively.

Figure 7:
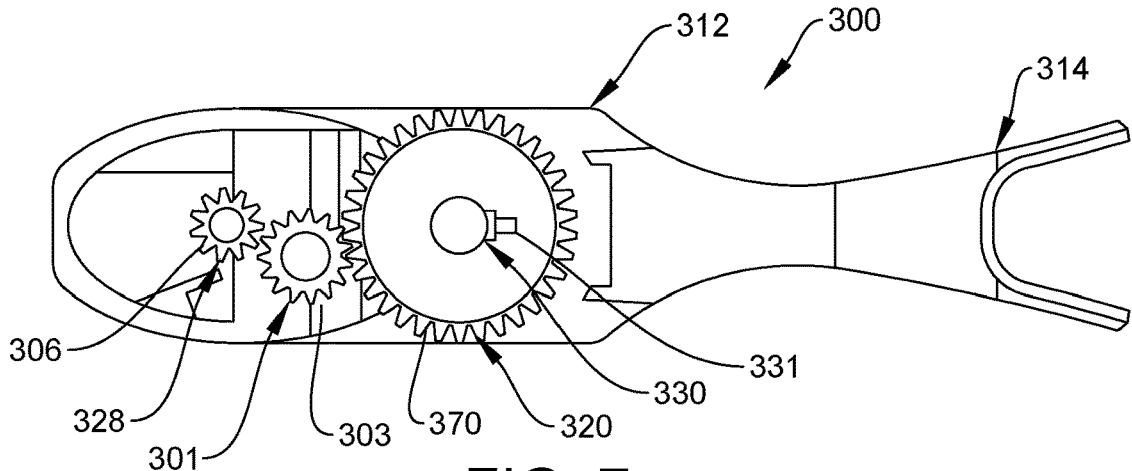
FIG. 7 is a top view of a portion of another example dental flosser in accordance with the present disclosure.

FIG. 7 illustrates another example of a dental flosser 300 that includes a handle 312, floss support 314, thumbwheel 320, dispensing and collecting spindles 328, 330 and an intermediate gear 301. The thumbwheel 320 has a plurality of gear teeth 370. The dispensing spindle 328 has a plurality of gear teeth 306. Intermediate gear 301 includes a plurality of gear teeth 303 that engage the gear teeth 370, 306. A friction member 331 applies a friction force to the collecting spindle 330 that resists rotation of the thumbwheel 320 unless sufficient rotational force is applied. The intermediate gear 301 translates the rotation force from the thumbwheel 320 directly to the dispensing spindle 328. The friction member 331 may have a variety of different configurations and include different types of material. For example, the friction member 331 may comprise a rubber material that is pressed against a hub of the collecting spindle 330.

Figure 8:
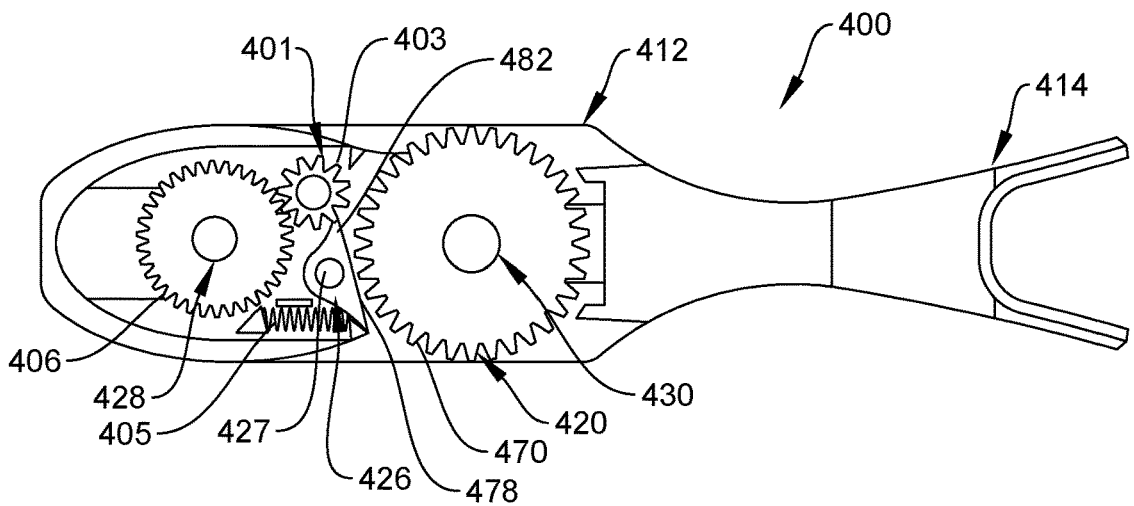
FIG. 8 is a top view of a portion of another example dental flosser in accordance with the present disclosure.

FIG. 8 illustrates another example of a dental flosser 400 that includes a handle 412, a floss support 414, a thumbwheel 420, a brake 426, dispensing and collecting spindles 428, 430, an intermediate gear 401, and a spring 405 that biases the brake 426 into a position engaging the thumbwheel 420 and the intermediate gear 401. The thumbwheel 420 includes a plurality of gear teeth 470. The dispensing spindle 428 includes a plurality of gear teeth 406. The intermediate gear 401 includes a plurality of gear teeth 403 that engage the gear teeth 406. The brake 426 includes a thumbwheel arm 478 that engages the gear teeth 470 of the thumbwheel 420, and a dispensing spool arm 482 that engages the gear teeth 403 of the intermediate gear 401. Applying a rotation force to the thumbwheel 420 releases the thumbwheel arm 478 from the gear teeth 470 and the dispensing spool arm 482 from the gear teeth 403 of the intermediate gear 401 to permit rotation of the dispensing spindle 428. Once the rotation force is released from the thumbwheel 420, the spring 405 biases the thumbwheel and dispensing spool arms 478, 482 into engagement with the respective gear teeth 470, 403.

Figure 9:
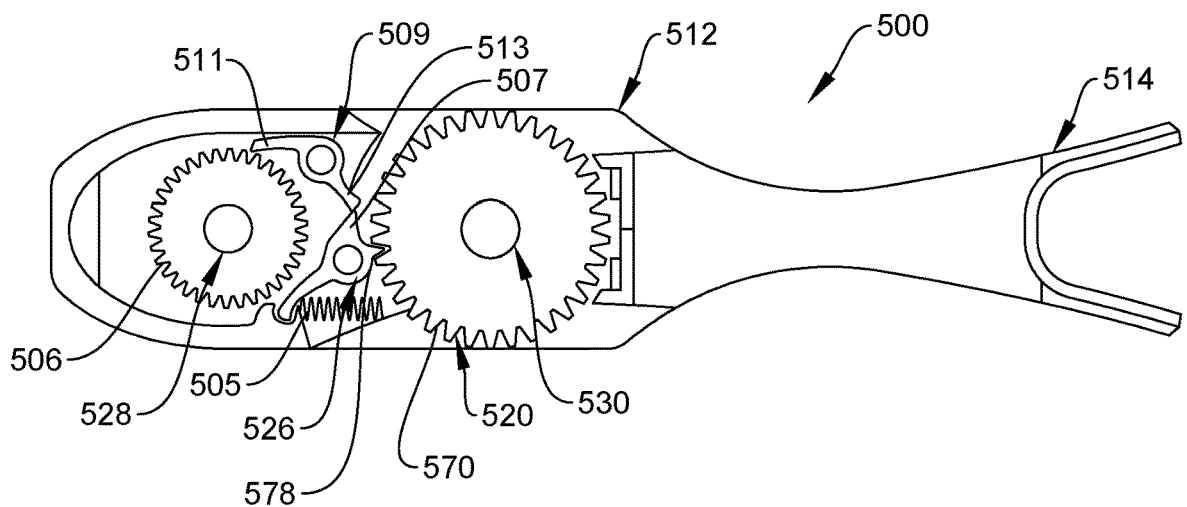
FIG. 9 is a top view of a portion of another example dental flosser in accordance with the present disclosure.

FIG. 9 illustrates another example of a dental flosser 500 that includes a handle 512, a floss support 514, a thumbwheel 520 having gear teeth 570, a first brake 526 having a thumbwheel arm 578 and first brake arm 507, a second brake member 509 having a collecting spool arm 511 and second brake arm 513, and dispensing and collecting spindles 528, 530. The dispensing spindle 528 includes a plurality of gear teeth 506. A spring 505 biases the first brake 526 into engagement with the gear teeth 570 and the second arm 513, thereby biasing the collecting spool arm 511 into engagement with the gear teeth 506. When a rotation force is applied to the thumbwheel 520 to take up the used floss, the thumbwheel arm 578 moves out of engagement with the gear teeth 570 and the second brake member 509 rotates to move the collecting spool arm 511 out of engagement with the gear teeth 506 so that the dispensing spindle 528 can rotate to release unused floss. Releasing the rotation force to the thumbwheel 520 permits the spring 505 to apply a biasing force that reengages the arms 578, 511 with the respective gear teeth 570, 506 of the thumbwheel 520 and the dispensing spindle 528.

The interface between the first and second brake arms 507, 513 may be a cam surface interface that provides variable amounts of rotation of the second brake member 509 relative to rotation of the first brake 526. Other types of interfaces may be possible between the arms 507, 513. Furthermore, a second spring or other biasing member may be operable to hold the second brake member 509 in a rest position in which the collecting spool arm 511 engages the gear teeth 506.

Figure 10:
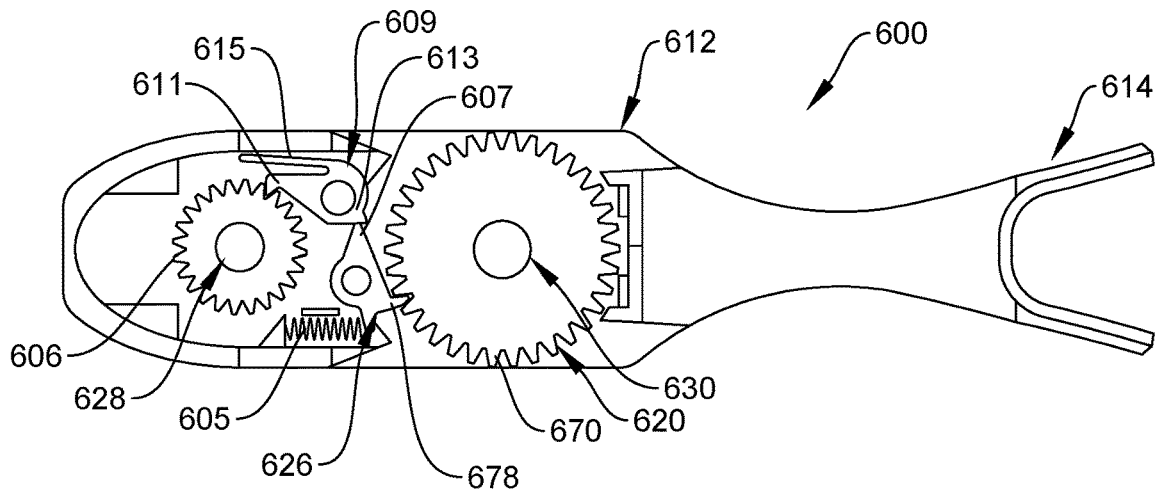
FIG. 10 is a top view of a portion of another example dental flosser in accordance with the present disclosure.

FIG. 10 illustrates another example of a dental flosser 600 that includes a handle 612, floss support 614, a thumbwheel 620, first and second brakes 626, 609, dispensing and collecting spindles 628, 630, and a spring 605. The thumbwheel 620 includes gear teeth 670. The dispensing spindle 628 includes gear teeth 606. The first brake 626 includes a thumbwheel arm 678 and a first arm 607. The second brake 609 includes a collecting spool arm 611, a second arm 613, and a third arm 615. The first and second arms 607, 613 may engage such as with a cam surface interface. The third arm 615 may act as a biasing member that biases the second brake 609 into a position in which the collecting spool arm 611 engages with the gear teeth 606. Rotating the thumbwheel 620 may move the thumbwheel arm 678 out of engagement with the gear teeth 670 and rotate the second brake 609 to move the collecting spool arm 611 out of engagement with the gear teeth 606. Releasing the rotation force on the thumbwheel 620 permits the spring 605 to bias the brake 626 such that the thumbwheel arm 678 reengages with the gear teeth 670 and permits the collecting spool arm 611 to reengage with the gear teeth 606.

Figure 11:
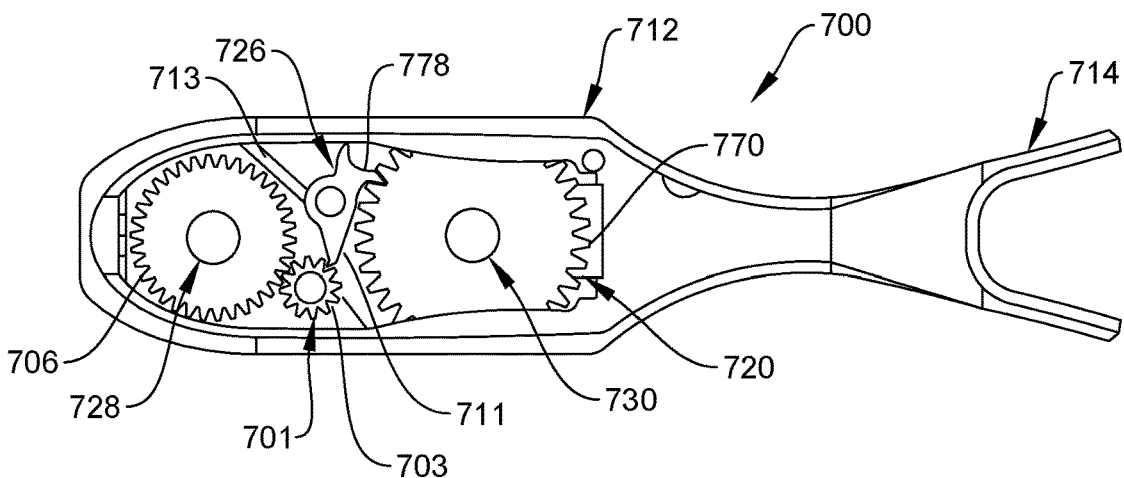
FIG. 11 is a top view of a portion of another example dental flosser in accordance with the present disclosure.

FIG. 11 illustrates a dental flosser 700 that includes a handle 712, a floss support 714, a thumbwheel 720, a brake 726, dispensing and collecting spindles 728, 730, and an intermediate gear 701. The thumbwheel 720 includes gear teeth 770. The dispensing spindle 728 includes gear teeth 706. The intermediate gear 701 includes gear teeth 703. The brake 726 includes a thumbwheel arm 778 and a second arm 711. Application of a rotation force to the thumbwheel 720 moves the thumbwheel arm 778 out of engagement with the gear teeth 770 and the second arm 711 out of engagement with the gear teeth 703 of the intermediate gear 701, thus permitting the dispensing spindle 728 to rotate freely. The brake 726 may include an additional arm 713 that acts as a biasing member to hold the brake 726 in a rotated position in which the thumbwheel arm 778 is engaged with the gear teeth 770. The arm 713 may interface with a side wall of the handle 712 or other feature and may have a size and shape that provides the desired biasing force.

Figure 12:
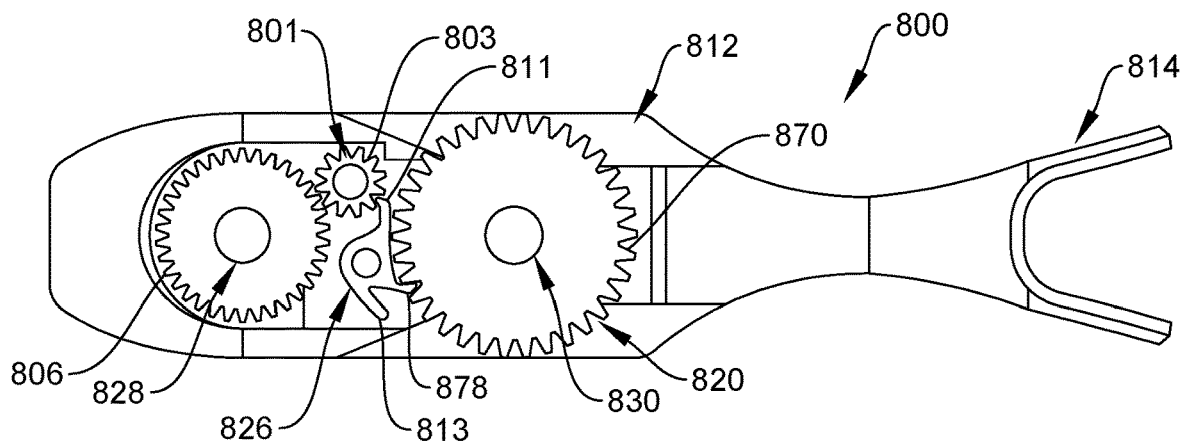
FIG. 12 is a top view of a portion of another example dental flosser in accordance with the present disclosure.

FIG. 12 illustrates a dental flosser 800 that includes a handle 812, floss support 814, thumbwheel 820, brake 826, dispensing and collecting spindles 828, 830, and an intermediate gear 801. The thumbwheel 820 includes gear teeth 870. The dispensing spindle 828 includes gear teeth 806. The intermediate gear 801 includes gear teeth 803. The brake 826 includes a thumbwheel arm 878, a first arm 811, and a second arm 813. The thumbwheel arm 878 engages with the gear teeth 870. The first arm 811 engages with gear teeth 803 at the intermediate gear 801. The second arm 813 engages a portion of the handle 812 to apply a biasing force that rotates the brake 826 to engage the thumbwheel arm 878 with the gear teeth 870. Applying a rotation force to the thumbwheel 820 removes the thumbwheel arm 878 from the gear teeth 870 and removes the first arm 811 from the gear teeth 803, thereby permitting the intermediate gear 801 and dispensing spindle 828 to rotate freely. FIG. 12 shows an arrangement in which the intermediate gear 801 and brake 826 are on opposite sides of a center line passing through the rotation axes of the dispensing and collecting spindles 828, 830. FIG. 11 shows an opposite arrangement in which the intermediate gear 701 and brake 726 are positioned on opposite sides of the same center line.

Figure 13:
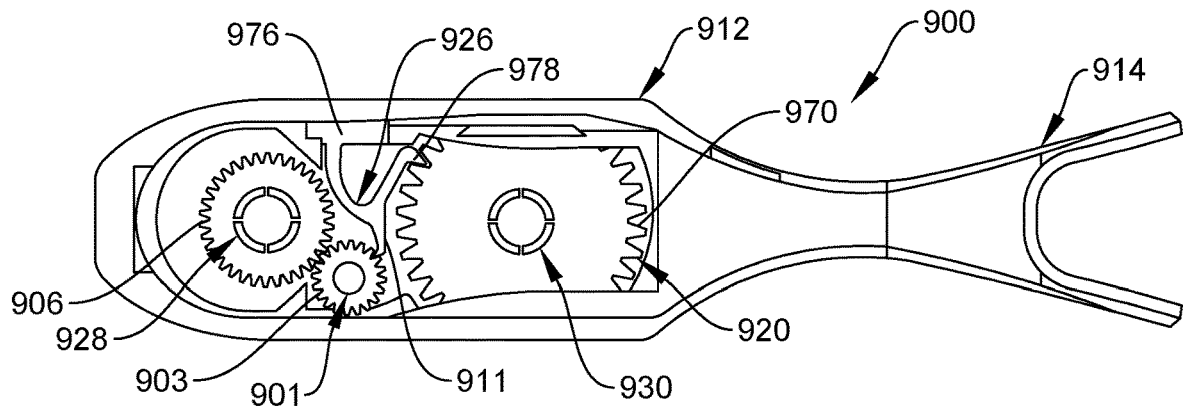
FIG. 13 is a top view of a portion of another example dental flosser in accordance with the present disclosure.

FIG. 13 illustrates a dental flosser 900 that includes a handle 912, floss support 914, thumbwheel 920, brake 926, dispensing and collecting spindles 928, 930, and intermediate gear 901. The thumbwheel 920 includes gear teeth 970. The dispensing spindle 928 includes gear teeth 906. The intermediate gear 901 includes gear teeth 903 that engage the gear teeth 906 on the dispensing spindle 928. The brake 926 includes a thumbwheel arm 978 and a first arm 911, as well as a handle connector 976 that connects the brake 926 to the handle 912. The thumbwheel arm 978 engages the gear teeth 970, and the first arm 911 engages the gear teeth 903 of intermediate gear 901. The brake 926 has a construction in which a biasing force is built into the construction (i.e., shape, size, and materials) of the brake 926 between the handle connector 976 and the arms 978, 911. Applying a rotation force to the thumbwheel 920 moves the thumbwheel arm 978 out of engagement with the gear teeth 970 and the first arm 911 out of engagement with the gear teeth 903, thus permitting the intermediate gear 901 and the dispensing spindle 928 to freely rotate. Removing the rotation force to the thumbwheel 920 permits the brake 926 to bias itself back into engagement with the gear teeth 970, 903. The brake 926 is mounted solely by its connection to the handle 912 via the handle connector 976 rather than using a brake pivot member (e.g., pivot member 227 described above with reference to FIG. 6) at a second location.

Figure 14:
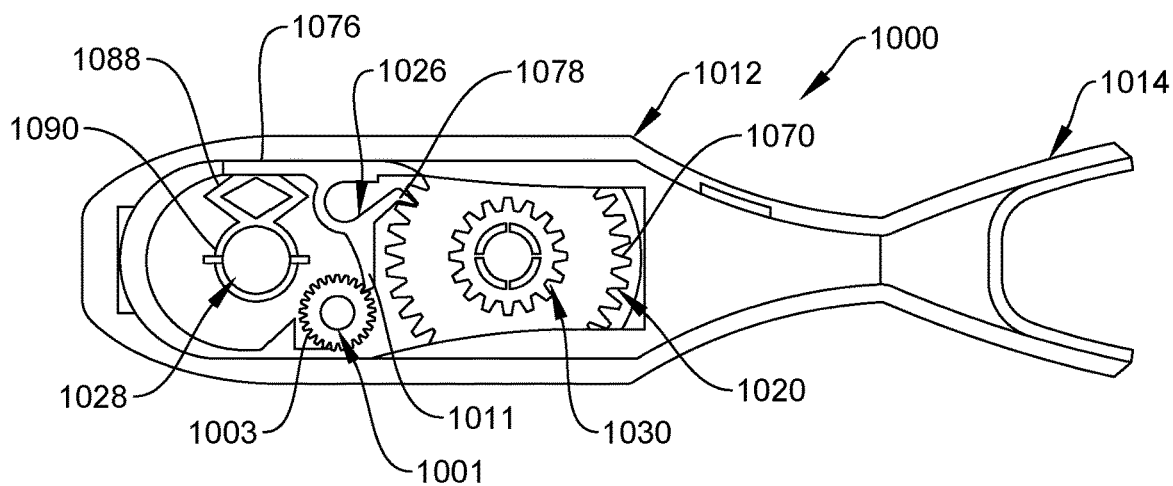
FIG. 14 is a top view of a portion of another example dental flosser in accordance with the present disclosure.

FIG. 14 illustrates a dental flosser 1000 that includes a handle 1012, a floss support 1014, a thumbwheel 1020, a brake 1026, dispensing and collecting spindles 1028, 1030, and an intermediate gear 1001. The thumbwheel 1020 includes gear teeth 1070. The intermediate gear 1001 includes gear teeth 1003. The brake 1026 includes a thumbwheel arm 1078 and a first arm 1011, and a handle connector 1076 that is mounted to the housing 1012. A brake pad arm 1088 and associated brake pad 1090 may be provided as a separate piece, or alternatively may be formed as a single unitary piece with remaining portions of the brake 1026. The brake pad 1090 may apply a friction force to the dispensing spindle 1028 to resist rotation of the spindle, thereby providing improved tension in the floss during take-up of used floss about the collecting spindle 1030. Applying a rotation force to the thumbwheel 1020 removes the thumbwheel arm 1078 from engagement with the gear teeth 1070, and the first arm 1011 from the gear teeth 1003 of the intermediate gear 1001. Although not shown, the dispensing spindle 1028 may also include a gear having a plurality of gear teeth 1006 that engage the gear teeth 1003 as well. Thus, when the intermediate gear 1001 is free to rotate, the dispensing spindle 1028 is also free to rotate. The gear of the dispensing spindle 1028 is removed in FIG. 14 to illustrate the shape, size and arrangement of the brake pad arm 1088 and brake pad 1090 about a hub of the dispensing spindle 1028. Releasing the rotation force applied to the thumbwheel 1020 permits the brake 1026 to bias itself back into engagement with the gear teeth 1070, 1003, thus locking rotation of the dispensing and collecting spindles 1028, 1030.

Figure 15:
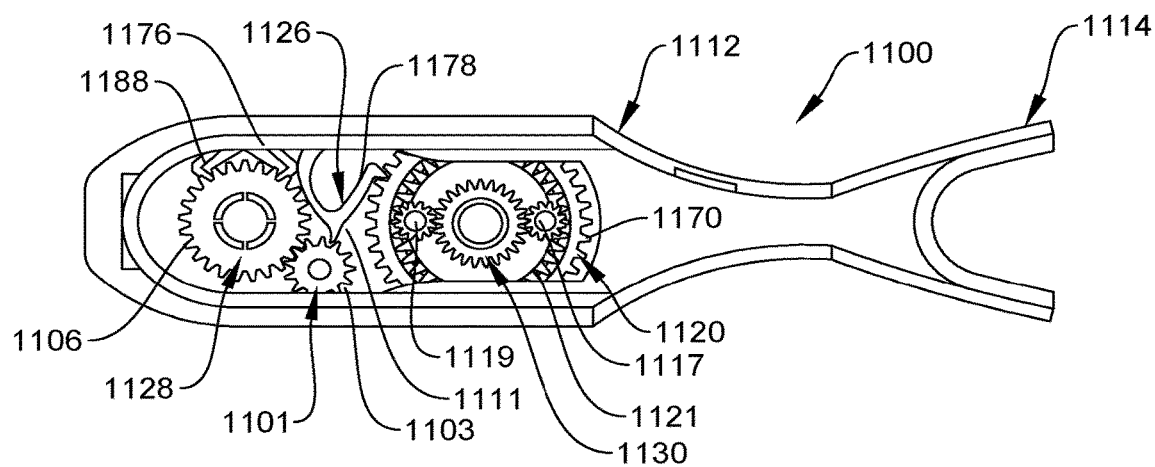
FIG. 15 is a top view of a portion of another example dental flosser in accordance with the present disclosure.

FIG. 15 shows a dental flosser 1100 having a handle 1112, a floss support 1114, a thumbwheel 1120, a brake 1126, dispensing and collecting spindles 1128, 1130, and an intermediate gear 1101 having gear teeth 1103. The thumbwheel 1120 includes gear teeth 1170. The dispensing spindle 1128 includes gear teeth 1106. The brake 1126 includes a thumbwheel arm 1178, a first arm 1111, and a handle connector 1176. The brake 1126 may also include a brake pad arm 1188 and brake pad (not shown). The thumbwheel 1120 and the collecting spindle 1130 may be constructed as a sun and planet gear arrangement. A plurality of planet gears 1117, 1119 may interface with the collecting spindle 1130 and additional gears 1121. The sun and planet arrangement may provide a different gear ratio between the collecting spindle 1130 and the rotation of the gear teeth 1170 of the thumbwheel 1120. By using the planet gear arrangement, less rotation force is required to move the collecting spindle 1130 and advance new floss. Other features and functionality provided by the dental flosser 1100 may be similar to the dental flosser 1000. FIG. 15 illustrates the gear having gear teeth 1106 for the dispensing spindle 1128 that are not illustrated in FIG. 14, as described above.

Figure 16:
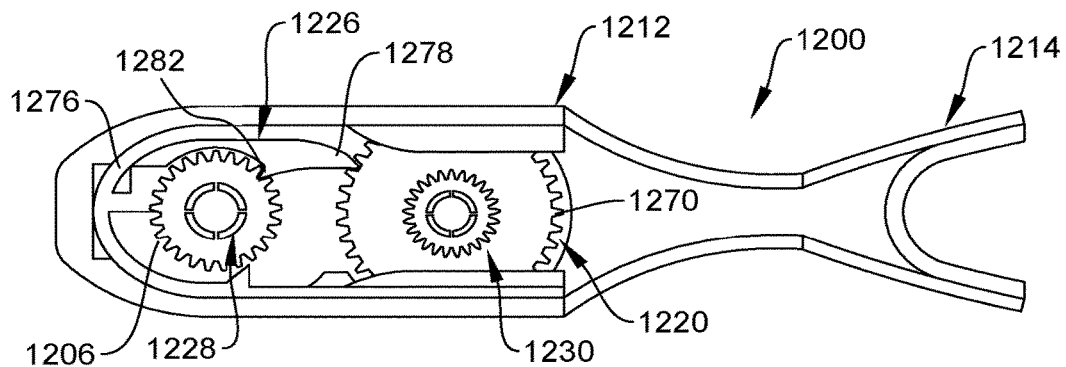
FIG. 16 is a top view of a portion of another example dental flosser in accordance with the present disclosure.

FIG. 16 illustrates a dental flosser 1200 that includes a handle 1212, a floss support 1214, a thumbwheel 1220, a brake 1226, and dispensing and collecting spindles 1228, 1230. The thumbwheel 1220 includes gear teeth 1270. The dispensing spindle 1228 includes gear teeth 1206. The brake 1226 includes a thumbwheel arm 1278, a dispensing spool arm 1282, and a handle connector 1276. The handle connector 1276 is connected to the handle 1212 at an end thereof adjacent to, for example, the hinge point for the cover. Applying a rotation force to the thumbwheel 1220 moves the thumbwheel arm 1278 out of engagement with the gear teeth 1270 and dispensing spool arm 1282 out of engagement with the gear teeth 1206. The brake 1226 has inherent bias provided therein due in part to its length, shape, and size such that removing the rotation force to the thumbwheel 1220 causes the thumbwheel arm 1278 to reengage with the gear teeth 1270 and the dispensing spool arm 1282 to reengage with the gear teeth 1206. In some arrangements, the brake 1226 may include multiple dispensing spool arms 1282, or at least multiple features that engage with the gear teeth 1206 around a perimeter of the gear of the dispensing spindle 1228.

Figure 17:
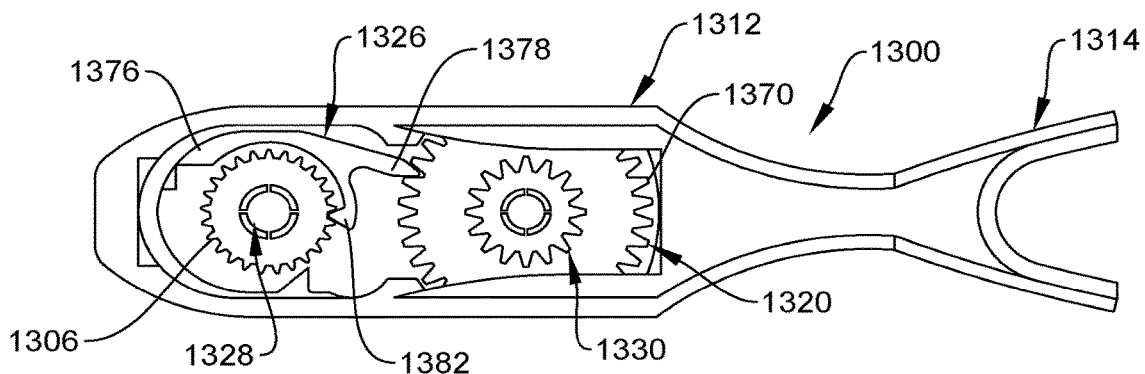
FIG. 17 is a top view of a portion of another example dental flosser in accordance with the present disclosure.

FIG. 17 illustrates a dental flosser 1300 that includes a handle 1312, a floss support 1314, a thumbwheel 1320, a brake 1326, and dispensing and collecting spindles 1328, 1330. The thumbwheel 1320 includes gear teeth 1370. The dispensing spindle 1328 includes gear teeth 1306. The brake 1326 includes thumbwheel and dispensing spool arms 1378, 1382, and a handle connector 1376. The brake 1326 has a shape that clearly defines the arms 1378, 1382 and positions their connection point with respective gear teeth 1370, 1306 at relative rotation angles to each other in the range of about 40 to about 80 degrees. The handle connector 1376 is connected to the handle 1312 at a location at a rear end of the handle such that the brake 1326 extends around a perimeter of the gear 1306 of the dispensing spindle 1328. The shape, size, and construction of the brake 1326 provides a biasing force that automatically moves the arms 1378, 1382 back into engagement with respective gear teeth upon releasing a rotation force to the thumbwheel 1320 during take-up of the floss.

Figure 18:
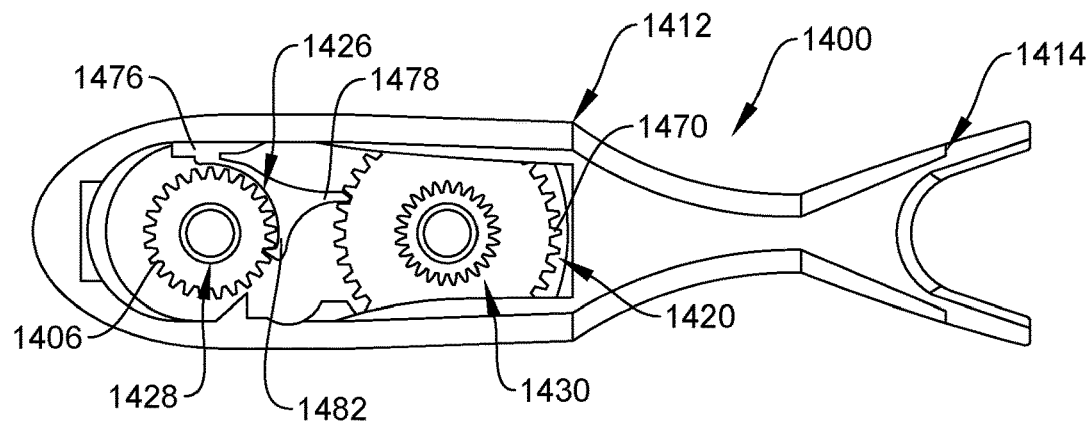
FIG. 18 is a top view of a portion of another example dental flosser in accordance with the present disclosure.

FIG. 18 illustrates a dental flosser 1400 that includes a handle 1412, a floss support 1414, a thumbwheel 1420, a brake 1426, and dispensing and collecting spindles 1428, 1430. The thumbwheel 1420 includes gear teeth 1470. The dispensing spindle 1428 includes gear teeth 1406. The brake 1426 includes thumbwheel and dispensing spool arms 1478, 1482 and a handle connector 1476. The handle connector 1476 is mounted to the handle 1412 along a side thereof spaced away from the end of the handle 1412. The brake 1426 is configured such that a portion thereof extends around a perimeter of the gear of the dispensing spindle 1428. The brake 1426 includes distinctive thumbwheel and dispensing spool arms 1478, 1482 that engage respective gear teeth 1470, 1406 at relative angles from each other in a range of about 40 degrees to about 80 degrees. A brake 1426 is shaped in size to provide a biasing force that moves the thumbwheel and dispensing spool arms 1478, 1482 into engagement with respective gear teeth 1470, 1406 upon removal of a rotation force to the thumbwheel 1420 during take-up of used floss.

Figure 19:
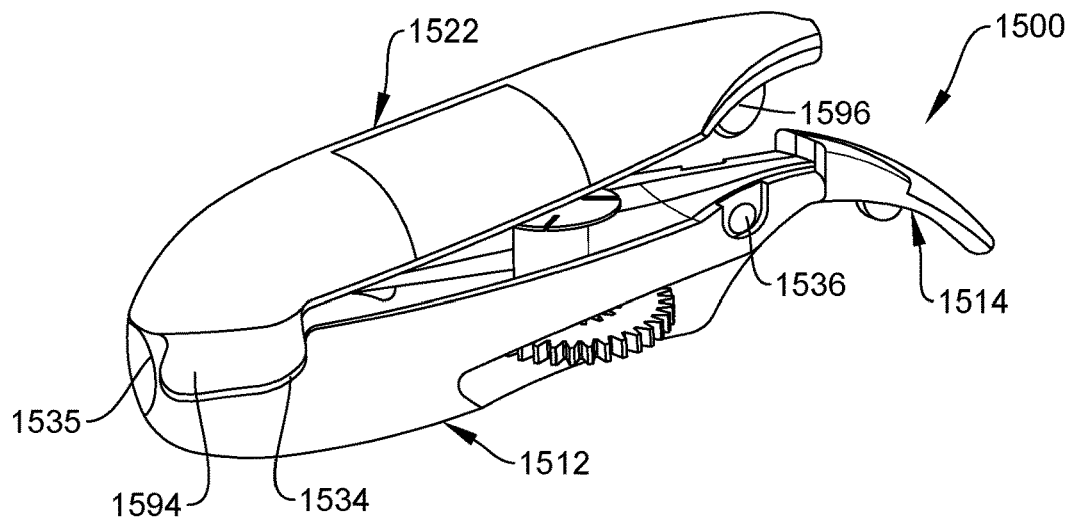
FIG. 19 is a rear perspective view of another example dental flosser in accordance with the present disclosure.

FIG. 19 illustrates a dental flosser 1500 that includes a handle 1512, a floss support 1514, and a cover 1522. The cover 1522 is pivotally connected to the handle 1512 at an interface between a cover attachment recess 1534 of the handle 1512 and a hinge member 1594 of the cover 1522. The hinge member 1594 is arranged primarily on an outside of the handle 1512 and/or is exposed along an outer surface of the handle 1512. The cover attachment recess 1534 may include first and second cover attachment recesses 1534 positioned on opposing sides of the handle 1512 with a cover attachment member 1535 defined therebetween. One of the cover attachment member 1535 and hinge member 1594 may include one or more connecting features that provide the pivotal movement therebetween that permits the cover 1522 to pivot between the open position shown in FIG. 19 and a closed position (not shown).

The handle 1512 further includes one or more latch grooves 1536 sized and arranged to interface with one or more latch members 1596 of the cover 1522. The latch grooves 1536 are exposed along an outer surface of the handle 1512 as compared to being positioned along an inner surface included in the handle 12 described above with reference to FIGS. 1-5. The latch members 1596 may provide a snap-lock connection between the handle 1512 and cover 1522.

Figure 20:
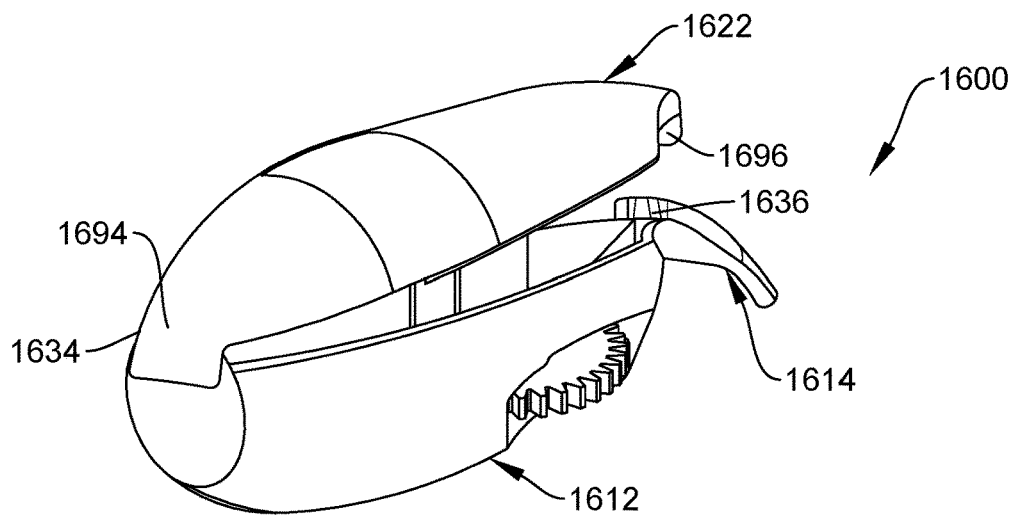
FIG. 20 is a rear perspective view of another example dental flosser in accordance with the present disclosure.

FIG. 20 shows another example of a dental flosser 1600 that includes a handle 1612, a floss support 1614, and a cover 1622. The handle 1612 includes a cover attachment recess 1634 that receives a hinge member 1694 of the cover 1622. The interface between the cover attachment recess 1634 and the hinge member 1694 provides a pivotal connection that permits the cover 1622 to pivot between the open position shown in FIG. 20 and a closed position (not shown).

The handle 1612 may also include one or more latch grooves 1636 receptive of one or more latch member 1696 of the cover 1622. The latch grooves 1636 are arranged centrally along a center line of the dental flosser 1600 and may be aligned with the hinge member 1694. The latch member 1696 may provide a snap-fit connection between the handle 1612 and cover 1622.

FIGS. 19 and 20 illustrate a few of the many different configurations possible for connecting a handle of the dental flosser to the cover of the dental flosser with a pivot connection and a releasable closure device (e.g., snap-fit connection). Many other configurations are possible, including configurations in which the cover is fully separable from the handle rather than being pivotally connected so as to provide improved access to the internal cavity and related internal components of the dental flosser. In other examples, the cover may be permanently connected to the handle. The cover may have a configuration that is intended to be disposable, such as one in which it is not possible to replace the dispensing spool with additional floss or re-spool the floss in the event of the floss breaking. Examples of permanent connections involve, for example, adhesive bonds, heat welds, and non-releasable snap-fit connections.

Figure 21:
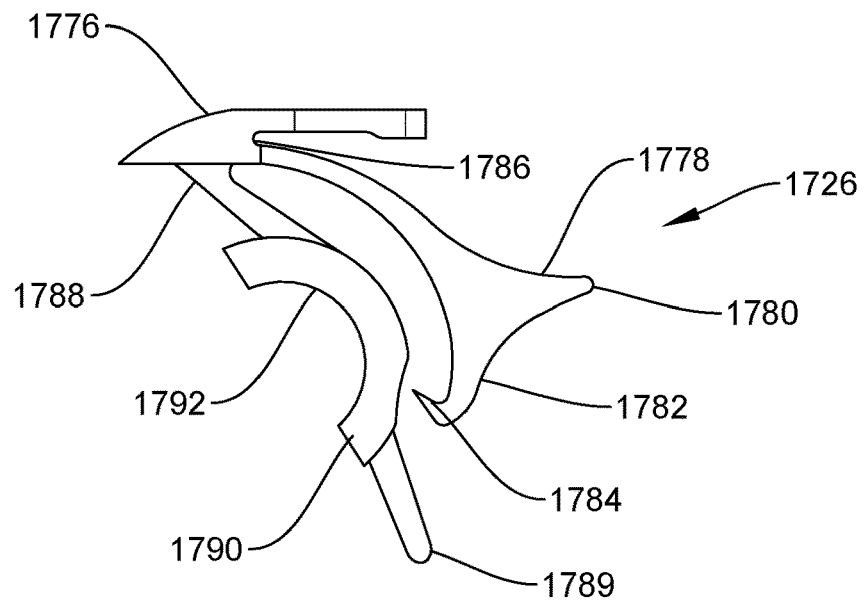
FIG. 21 is a top view of another example brake for use in the dental flossers disclosed herein.

FIG. 21 shows another example brake 1726 for use in the dental flossers disclosed herein. The brake 1726 includes a handle connector 1776, a thumbwheel arm 1778 having a tip 1780, a dispensing spool arm 1782 having a tip 1784, a hinge 1786, a brake pad arm 1788, and a brake pad 1790 having a spindle surface 1792. The handle connector 1776 is arranged and sized to fit in the brake recess of a handle of the dental flosser (e.g., handle 12 of dental flosser 10). The brake pad 1790 may have a second brake pad arm 1789 to contact or connect to an opposite side of the handle (e.g., handle 12 of dental flosser 10). The second brake pad arm 1789 may provide improved stability and reduced movement of the brake pad 1790 during use. In at least some examples, the second brake pad arm 1789 may extend out of the housing and arranged to be manually contacted by a user to apply a braking force to the spindle.

Figure 22:
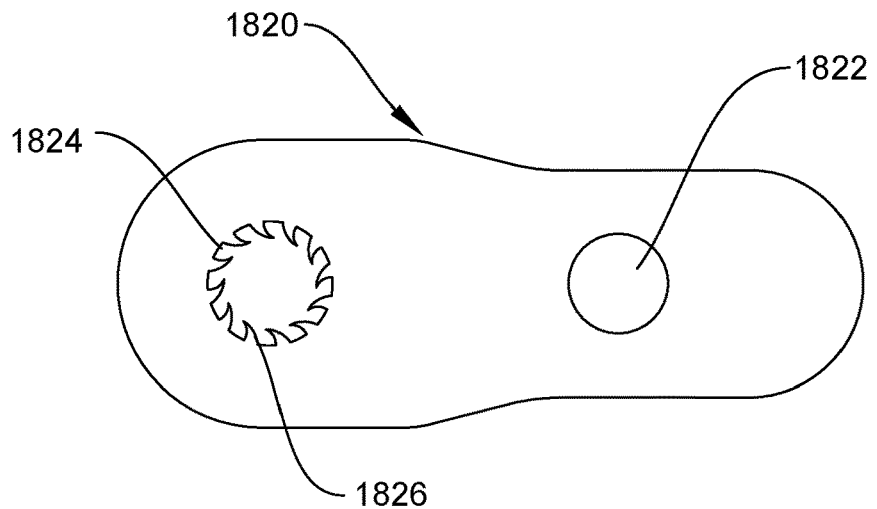
FIG. 22 is a top view of another example barrier member for use in the dental flossers disclosed herein, the barrier member having a friction feature.
Figure 23:
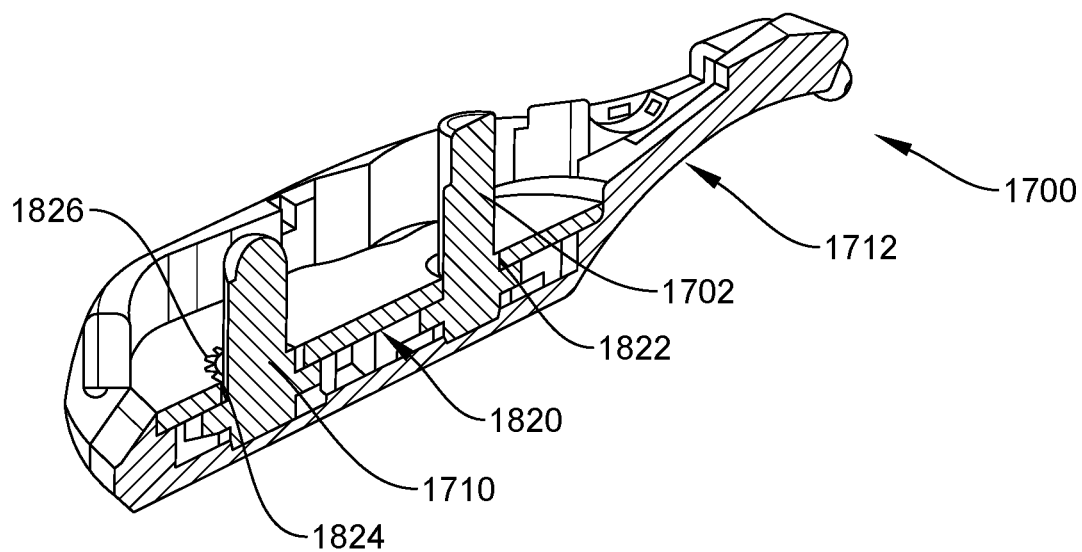
FIG. 23 is a perspective cross-sectional view of a dental flosser having the barrier member of FIG. 22.

FIG. 22 shows an alternative barrier member 1820 (also referred to as a floor or plate of the dental flosser). The barrier member 1820 may be positioned within the housing (e.g., housing 1712 of dental flosser 1700 shown in FIG. 23) between the dispensing and collecting spools and the area in the housing where the thumbwheel and gears are located. The barrier member 1820 may include openings 1822, 1824 through which the hubs 1702, 1710 extend. See FIG. 23. The barrier member 1820 may include friction members 1826 exposed within one or both of the openings 1822, 1824. The friction members 1826 shown in FIGS. 22 and 23 are configured as teeth that extending into the opening 1822. The friction members 1826 may be rigid or flexible. The friction members 1826 may be pointed in one circumferential direction, such as a direction that would provide increased friction for rotation of the hub 1710 in a particular direction, such as a direction that would permit undesired unwinding of the unwind spool that is attached to the hub 1710. The amount of friction can be controlled by changing, for example, the number, size, orientation, materials, shape, and/or other properties of the friction members 1826.

Figure 24:
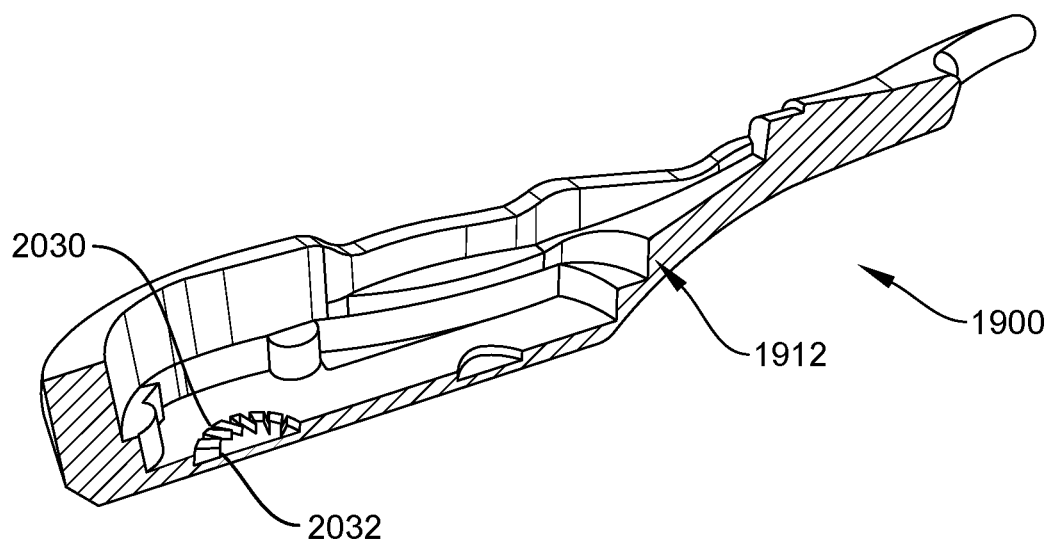
FIG. 24 is a perspective cross-sectional view of a handle of a dental flosser, the handle having a friction feature integrated into a spindle seat that receives a spindle for the unwind spool of the dental flosser.

FIG. 24 is a perspective cross-sectional view of a handle 1912 of a dental flosser 1900. The handle 1912 has at least one friction member 2032 (e.g., a plurality of friction members 2032) integrated into a spindle seat 2030. The spindle seat 2030 receives a spindle for the unwind spool of the dental flosser 1900. The friction member 2032 may be the same or similar to the friction members 1826 described above with reference to FIGS. 22 and 23.

Figure 25:
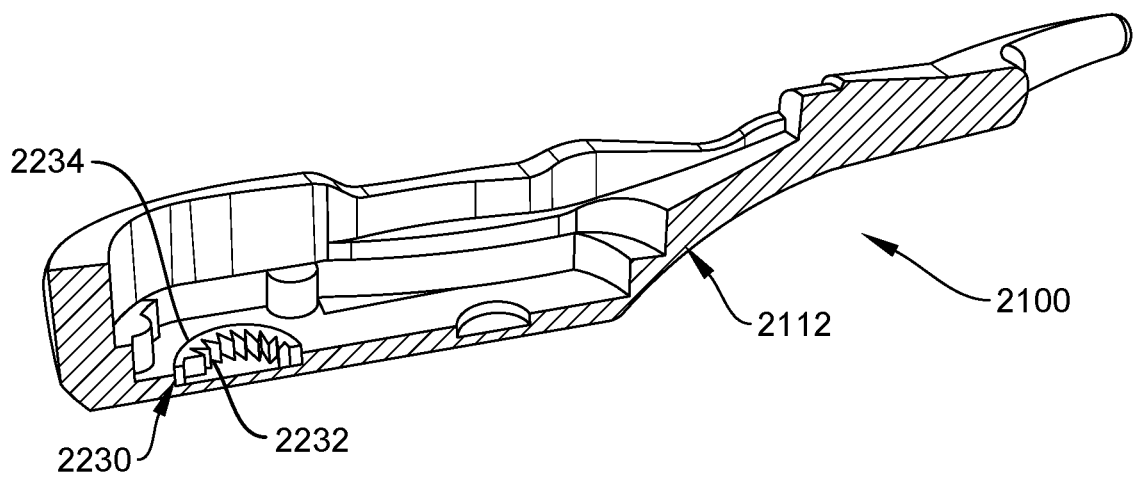
FIG. 25 is a perspective cross-sectional view of a handle of a dental flosser, the handle having a friction feature integrated into a bushing arranged in a spindle seat of the handle, the bushing and spindle seat to receive a spindle for the unwind spool of the dental flosser.
Figure 26:
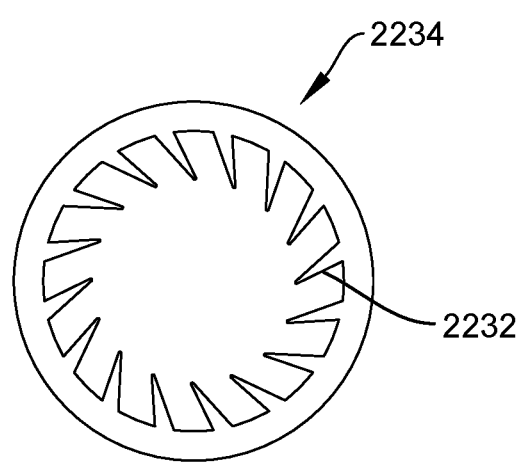
FIG. 26 is a top view of the bushing with friction feature shown in FIG. 25.

FIG. 25 is a perspective cross-sectional view of a handle 2112 of a dental flosser 2100. The handle 2112 has a bushing 2234 that is mounted within a spindle seat 2230. The bushing 2234 includes at least one friction member 2232 (e.g., a plurality of friction members 2232). The bushing 2234 receives a spindle for the unwind spool of the dental flosser 2100. The friction member 2232 may be the same or similar to the friction members 1826, 2032 described above with reference to FIGS. 22-24. FIG. 26 is a top view of the bushing 2234 with friction members 2232.

Figure 27:
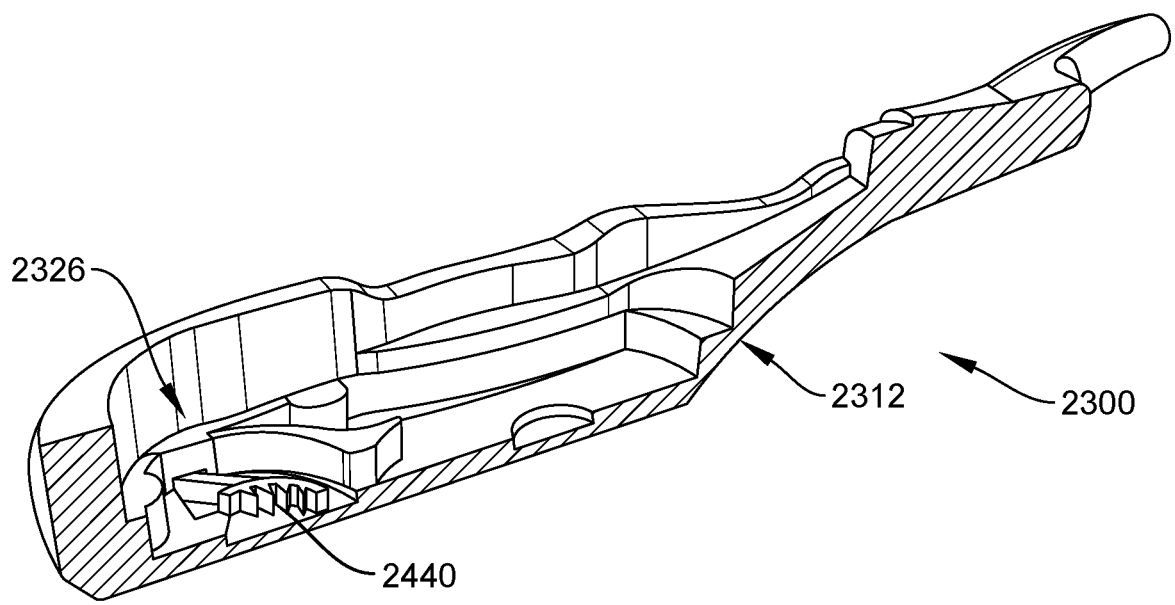
FIG. 27 is a perspective cross-sectional view of a handle of a dental flosser with a brake mounted therein, the brake having a friction feature that engages a spindle for the unwind spool of the dental flosser.
Figure 28:
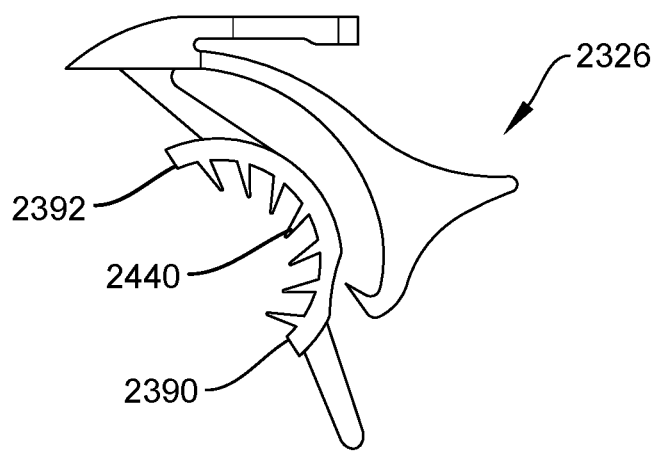
FIG. 28 is a top view of the brake shown in FIG. 27.

FIG. 27 is a perspective cross-sectional view of a handle 2312 of a dental flosser 2300 with a brake 2326 mounted therein. The brake 2326 has at least one friction member 2440 that engages a spindle for the unwind spool of the dental flosser 2300. The friction members 2440 may be arranged on a spindle surface 2392 of a brake pad 2390 of the brake 2326. The friction members 2440 may be the same or similar to the friction members 1826, 2032, 2232 described above. FIG. 28 is a top view of the brake shown in FIG. 27.

Figure 29:
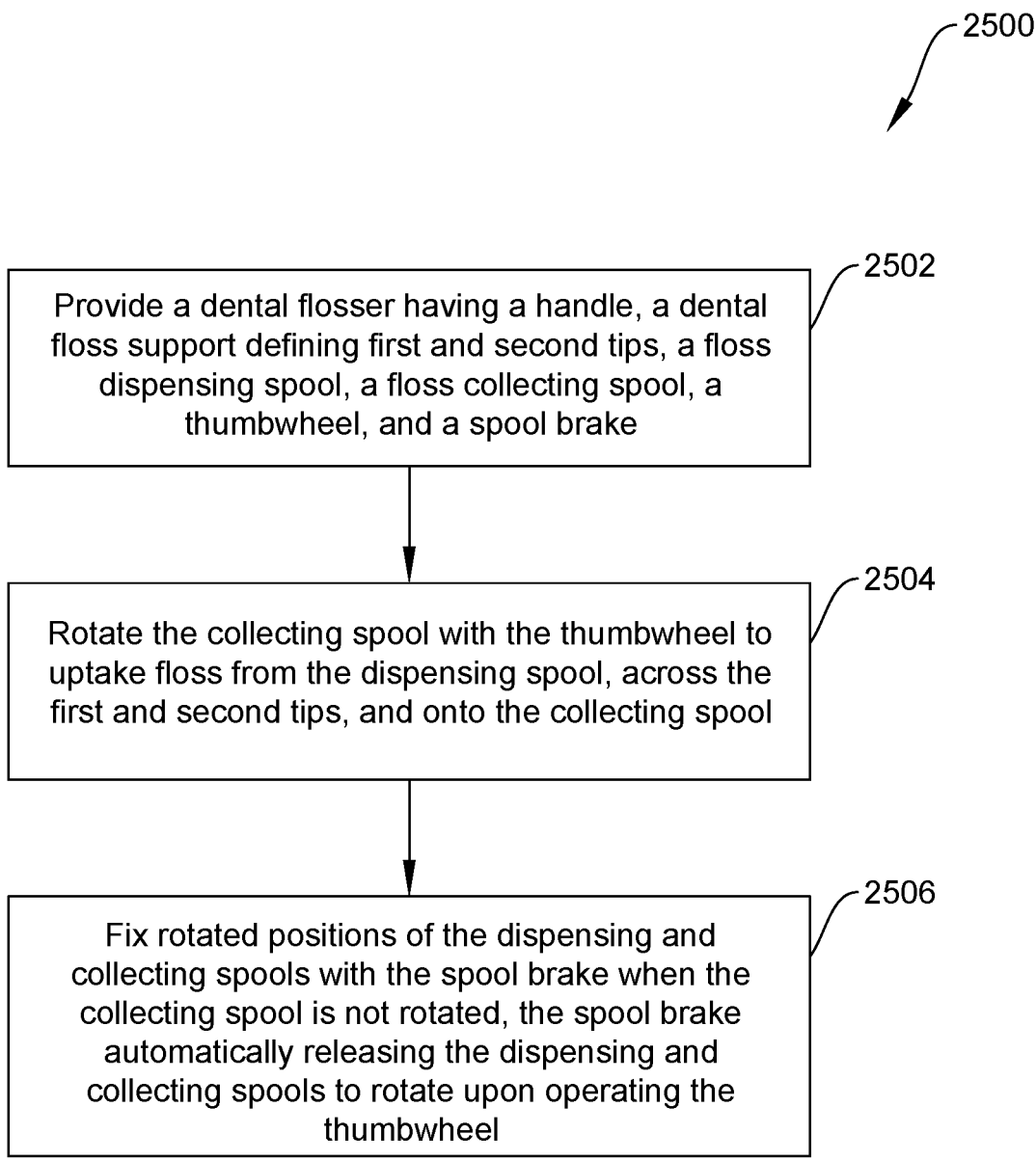
FIG. 29 is a flow chart showing steps of an example method in accordance with the present disclosure.

FIG. 29 shows steps of an example method 2500 for operating a dental flosser in accordance with the present disclosure. The method 2500 may apply to any of the embodiments disclosed herein with reference to FIGS. 1-28. The method 2500 includes, at block 2502, providing a dental flosser having a handle, a dental floss support defining first and second tops, a floss dispensing spool, a floss collection spool, a thumbwheel, and a spool brake. Block 2504 includes rotating the collecting spool with the thumbwheel to uptake floss from the dispensing spool, across the first and second tips, and onto the collecting spool. Block 2506 includes fixing rotated positions of the dispensing and collecting spools with the spool brake when the collecting spool is not rotated, the spool brake automatically releasing dispensing and collecting spools to rotate upon operating the thumbwheel.

The method 2500 may also include providing the spool brake with first and second arms arranged to engage the collecting and dispensing spools, respectively, to fix the rotated positions. The thumbwheel may be arranged coaxially with the collecting spool, the thumbwheel may include a plurality of gear teeth for engagement by the first arm of the spool brake, the dental flosser may further include a dispensing gear arranged coaxially with the dispensing spool and having a plurality of gear teeth for engagement by the second arm of the spool brake. Application of a tension force to the floss may increase contact forces between the spool brake and the dispensing and collecting spools. The housing may include a base and a cover, the cover may be pivotally connected to a rear end of the housing at a location opposite a front end where the first and second tips are located, and the cover may be releasably held in a closed position by at least one snap feature positioned along a side of the base between the rear and front ends.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A dental flosser, comprising:
a handle;
a dental floss support mounted to the handle and having first and second projections, each projection defining a tip;
a floss dispensing spool mounted to the handle;
a dispensing gear mounted to the handle coaxially with the floss dispensing spool;
a floss collecting spool mounted to the handle;
a thumbwheel operable to rotate the floss collecting spool and cause uptake of floss from the floss dispensing spool, across the tips of the first and second projections, and onto the floss collecting spool; and a spool brake member mounted to the handle and operable to fix rotation of the floss dispensing spool and the floss collecting spool, and to automatically release rotation of the floss dispensing spool upon rotation of the thumbwheel;

wherein the thumbwheel is accessible from opposite sides of the exterior of the handle;

wherein the thumbwheel includes teeth and is mounted to the handle coaxially with the floss collecting spool; and wherein the spool brake member is operable to engage the dispensing gear and the teeth of the thumbwheel to control rotation of the floss dispensing spool and the floss collecting spool.

2. The dental flosser of claim 1, wherein the dispensing gear includes gear teeth that are a different size than the teeth of the thumbwheel.

3. The dental flosser of claim 2, wherein the teeth of the thumbwheel are larger than the gear teeth of the dispensing gear.

4. The dental flosser of claim 1, comprising a cover movable between an open position where the floss dispensing spool and the floss collecting spool can be removed from the handle and a closed position where the floss dispensing spool and the floss collecting spool are enclosed in the handle, and wherein the thumbwheel is accessible from the opposite sides of the exterior of the handle when the cover is in the closed position.

5. A dental flosser, comprising:
a handle;
a floss support coupled to the handle, the floss support including a first projection having a first tip and a second projection having a second tip;
a floss dispensing spool coupled to the handle;
a dispensing gear coupled to the handle and positioned coaxially with the floss dispensing spool;
a floss collecting spool coupled to the handle;
a thumbwheel coupled to the handle, the thumbwheel being configured to rotate the floss collecting spool and cause floss to move from the floss dispensing spool, across the first tip and the second tip, and onto the floss collecting spool; and
a spool brake coupled to the handle, the spool brake being configured to lock rotation of the floss dispensing spool and automatically release rotation of the floss dispensing spool upon rotation of the thumbwheel;
wherein the thumbwheel is accessible from opposite sides of the exterior of the handle; and
wherein the spool brake is configured to engage the dispensing gear to lock rotation of the floss dispensing spool.

6. The dental flosser of claim 5 comprising a cover movable between an open position where the floss dispensing spool and the floss collecting spool can be removed from the handle and a closed position where the floss dispensing spool and the floss collecting spool are enclosed in the handle, and wherein the thumbwheel is accessible from the opposite sides of the exterior of the handle when the cover is in the closed position.

7. The dental flosser of claim 5, further comprising a collecting gear coupled to the handle and positioned coaxially with the floss collecting spool and the thumbwheel.

8. The dental flosser of claim 5, wherein the thumbwheel includes teeth and wherein the spool brake engages the teeth of the thumbwheel when the spool brake locks rotation of the floss dispensing spool.

9. The dental flosser of claim 8, wherein the dispensing gear includes gear teeth that are a different size than the teeth of the thumbwheel.

10. The dental flosser of claim 9, wherein the teeth of the thumbwheel are larger than the gear teeth of the dispensing gear.

11. The dental flosser of claim 9, the thumbwheel has a larger diameter than the dispensing gear.

12. A dental flosser, comprising:
a handle;
a floss support coupled to the handle, the floss support including a first projection having a first tip and a second projection having a second tip;
a floss dispensing spindle coupled to the handle;
a floss collecting spindle coupled to the handle;
a thumbwheel coupled to the handle, the thumbwheel being configured to rotate the floss collecting spindle and cause floss to move from the floss dispensing spindle, across the first tip and the second tip, and onto the floss collecting spindle; and
a spool brake coupled to the handle, the spool brake being configured to lock rotation of the floss dispensing spindle and the floss collecting spindle and automatically release rotation of the floss dispensing spindle upon rotation of the thumbwheel;
wherein the spool brake includes a brake pad positioned to resist rotation of the floss dispensing spindle;
wherein the spool brake includes tips that engage corresponding teeth to lock rotation of the floss dispensing spindle and the floss collecting spindle; and
wherein the brake pad is positioned to resist rotation of the floss dispensing spindle without engaging the teeth.

13. The dental flosser of claim 12, wherein the brake pad resists rotation of the floss dispensing spindle by pressing against the floss dispensing spindle.

14. The dental flosser of claim 12, wherein the thumbwheel is accessible from opposite sides of the exterior of the handle.

15. The dental flosser of claim 12, further comprising a dispensing gear coupled to the handle and positioned coaxially with the floss dispensing spindle.

16. The dental flosser of claim 15, wherein the floss dispensing spindle and the dispensing gear are a single integral component.

17. A dental flosser, comprising:
a handle;
a floss support coupled to the handle, the floss support including a first projection having a first tip and a second projection having a second tip;
a floss dispensing spool coupled to the handle;
a dispensing gear coupled to the handle and positioned coaxially with the floss dispensing spool;
a floss collecting spool coupled to the handle;
a collecting gear coupled to the handle and positioned coaxially with the floss collecting spool;
a thumbwheel coupled to the handle, the thumbwheel being configured to rotate the floss collecting spool and cause floss to move from the floss dispensing spool, across the first tip and the second tip, and onto the floss collecting spool; and
a spool brake coupled to the handle, the spool brake being configured to lock rotation of the floss dispensing spool and the floss collecting spool and automatically release rotation of the floss dispensing spool upon rotation of the thumbwheel;
wherein the floss dispensing spool and/or the floss collecting spool is releasably coupled to the dental flosser to allow the floss dispensing spool and/or the floss collecting spool to be removed from the dental flosser without removing the dispensing gear and/or the collecting gear, respectively.

18. The dental flosser of claim 17, wherein the floss dispensing spool and the floss collecting spool are releasably coupled to the dental flosser to allow the floss dispensing spool and the floss collecting spool to be removed from the dental flosser without removing the dispensing gear or the collecting gear.

19. The dental flosser of claim 17, wherein the spool brake is configured to engage the dispensing gear to lock rotation of the floss dispensing spool.

20. The dental flosser of claim 17, wherein the thumbwheel is accessible from opposite sides of the exterior of the handle.

21. The dental flosser of claim 17, wherein the spool brake includes a brake pad positioned to resist rotation of the floss dispensing spool.

22. The dental flosser of claim 21, further comprising a floss dispensing spindle that includes the dispensing gear, wherein the brake pad resists rotation of the floss dispensing spool by pressing against the floss dispensing spindle.

23. A dental flosser, comprising:
a handle;
a floss support coupled to the handle, the floss support including a first projection having a first tip and a second projection having a second tip;
a floss dispensing spool coupled to the handle;
a floss collecting spool coupled to the handle;
a thumbwheel coupled to the handle, the thumbwheel being configured to rotate the floss collecting spool and cause floss to move from the floss dispensing spool, across the first tip and the second tip, and onto the floss collecting spool;
a collecting gear coupled to the handle and positioned coaxially with the floss collecting spool and the thumbwheel; and
a spool brake coupled to the handle, the spool brake being configured to lock rotation of the floss dispensing spool and automatically release rotation of the floss dispensing spool upon rotation of the thumbwheel;
wherein the thumbwheel is accessible from opposite sides of the exterior of the handle; and
wherein the handle includes a slot sized to receive the thumbwheel and the thumbwheel includes a toothed bore configured to receive the collecting gear.

24. The dental flosser of claim 23, wherein the dental flosser is configured to be assembled by inserting the thumbwheel into the handle parallel to a plane and then moving the collecting gear at least substantially perpendicularly to the plane and into engagement with the thumbwheel.

25. The dental flosser of claim 23, further comprising a dispensing gear coupled to the handle and positioned coaxially with the floss dispensing spool, wherein the spool brake is configured to engage the dispensing gear to lock rotation of the floss dispensing spool.

26. The dental flosser of claim 25, wherein the thumbwheel includes teeth and wherein the spool brake engages the teeth of the thumbwheel when the spool brake locks rotation of the floss dispensing spool.

27. The dental flosser of claim 26, wherein the dispensing gear includes gear teeth that are a different size than the teeth of the thumbwheel.

28. The dental flosser of claim 27, wherein the teeth of the thumbwheel are larger than the gear teeth of the dispensing gear.

29. The dental flosser of claim 27, the thumbwheel has a larger diameter than the dispensing gear.

* * * * *